US008675549B2

(12) United States Patent
Barriac et al.

(10) Patent No.: US 8,675,549 B2
(45) Date of Patent: Mar. 18, 2014

(54) METHOD OF SERVING SECTOR MAINTENANCE IN A WIRELESS COMMUNICATION SYSTEMS

(75) Inventors: Gwendolyn D. Barriac, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 12/091,479

(22) PCT Filed: Oct. 27, 2006

(86) PCT No.: PCT/US2006/042226
§ 371 (c)(1),
(2), (4) Date: Oct. 6, 2008

(87) PCT Pub. No.: WO2007/050982
PCT Pub. Date: May 3, 2007

(65) Prior Publication Data
US 2009/0219857 A1  Sep. 3, 2009

Related U.S. Application Data

(60) Provisional application No. 60/731,037, filed on Oct. 27, 2005.

(51) Int. Cl.
*H04W 4/00* (2009.01)
(52) U.S. Cl.
USPC .......................................................... 370/328
(58) Field of Classification Search
USPC .......................................................... 370/328
See application file for complete search history.

(56) References Cited

U.S. PATENT DOCUMENTS

| 5,021,777 A | 6/1991 | Gross et al. |
| 5,196,728 A | 3/1993 | Jaux |
| 5,267,261 A | 11/1993 | Blakeney, II et al. |
| 5,276,911 A | 1/1994 | Levine et al. |

(Continued)

FOREIGN PATENT DOCUMENTS

| CA | 2340201 A1 | 1/2001 |
| CN | 1346580 A | 4/2002 |

(Continued)

OTHER PUBLICATIONS

Soong et al., Aug. 2003, "Forward High Speed Wireless Packet Data Service in IS-2000—1xEV-DV". IEEE Communications Magazine, 41(8), 170-177.*

(Continued)

*Primary Examiner* — Asad Nawaz
*Assistant Examiner* — Saad A Waqas

(57) ABSTRACT

An apparatus and method for serving sector maintenance in a wireless communication system is described. A forward link serving sector (FLSS) change command (ChangeFLSS) is received and it is determined if a FLSS in the ChangeFLSS command is a member of a NonSynchronousSubset. If the determination is positive, a reverse link serving sector (RLSS) and a dedicated RLSS (DRLSS) in the public data may be updated to be equal to the FLSS in the ChangeFLSS command, and indications that the RLSS and the DRLSS have changed may be issued. Otherwise, the FLSS and a dedicated FLSS (DFLSS) in the public data may be updated to be equal to the FUSS in the ChangeFLSS command, and indications that the FUSS and the DFLSS have changed may be issued.

10 Claims, 8 Drawing Sheets

(56) References Cited

U.S. PATENT DOCUMENTS

| | | | |
|---|---|---|---|
| 5,289,527 | A | 2/1994 | Tiedemann, Jr. |
| 5,363,426 | A | 11/1994 | Nyhart |
| 5,406,613 | A | 4/1995 | Peponides et al. |
| 5,490,139 | A | 2/1996 | Baker et al. |
| 5,640,414 | A | 6/1997 | Blakeney, II et al. |
| 5,678,192 | A | 10/1997 | Paavonen et al. |
| 5,802,467 | A | 9/1998 | Salazar et al. |
| 5,815,507 | A | 9/1998 | Vinggaard et al. |
| 5,818,825 | A | 10/1998 | Corrigan et al. |
| 5,818,842 | A | 10/1998 | Burwell et al. |
| 5,825,752 | A | 10/1998 | Fujimori et al. |
| 5,878,033 | A | 3/1999 | Mouly |
| 5,913,168 | A | 6/1999 | Moreau et al. |
| 5,946,292 | A | 8/1999 | Tsujishita et al. |
| 6,006,073 | A | 12/1999 | Glauner et al. |
| 6,012,160 | A | 1/2000 | Dent |
| 6,038,220 | A | 3/2000 | Kang et al. |
| 6,047,189 | A | 4/2000 | Yun et al. |
| 6,088,345 | A | 7/2000 | Sakoda et al. |
| 6,115,667 | A | 9/2000 | Nakamura |
| 6,118,767 | A | 9/2000 | Shen et al. |
| 6,119,005 | A | 9/2000 | Smolik |
| 6,128,290 | A * | 10/2000 | Carvey ............ 370/347 |
| 6,138,034 | A | 10/2000 | Willey |
| 6,144,841 | A | 11/2000 | Feeney |
| 6,144,861 | A | 11/2000 | Sundelin et al. |
| 6,154,659 | A | 11/2000 | Jalali et al. |
| 6,157,621 | A | 12/2000 | Brown et al. |
| 6,167,248 | A | 12/2000 | Hamalainen et al. |
| 6,169,768 | B1 | 1/2001 | Okada et al. |
| 6,175,550 | B1 | 1/2001 | Van Nee |
| 6,175,557 | B1 | 1/2001 | Diachina et al. |
| 6,181,738 | B1 | 1/2001 | Chheda et al. |
| 6,181,768 | B1 | 1/2001 | Berliner |
| 6,208,699 | B1 | 3/2001 | Chen et al. |
| 6,212,175 | B1 | 4/2001 | Harsch |
| 6,216,004 | B1 | 4/2001 | Tiedemann, Jr. et al. |
| 6,229,800 | B1 | 5/2001 | Thompson et al. |
| 6,249,681 | B1 | 6/2001 | Virtanen |
| 6,252,865 | B1 | 6/2001 | Walton et al. |
| 6,266,529 | B1 | 7/2001 | Chheda |
| 6,272,335 | B1 * | 8/2001 | Nakayama et al. ........ 455/422.1 |
| 6,278,882 | B1 | 8/2001 | Choi |
| 6,300,864 | B1 | 10/2001 | Willey |
| 6,307,846 | B1 | 10/2001 | Willey |
| 6,320,855 | B1 | 11/2001 | Shi |
| 6,359,900 | B1 | 3/2002 | Dinakar et al. |
| 6,366,779 | B1 | 4/2002 | Bender et al. |
| 6,369,447 | B2 | 4/2002 | Mori |
| 6,389,034 | B1 * | 5/2002 | Guo et al. ............ 370/441 |
| 6,421,540 | B1 | 7/2002 | Gilhousen et al. |
| 6,446,236 | B1 | 9/2002 | McEwen et al. |
| 6,477,361 | B1 | 11/2002 | LaGrotta et al. |
| 6,480,504 | B1 | 11/2002 | Wang et al. |
| 6,483,826 | B1 | 11/2002 | Åkerberg |
| 6,493,338 | B1 | 12/2002 | Preston et al. |
| 6,519,705 | B1 | 2/2003 | Leung |
| 6,532,227 | B1 | 3/2003 | Leppisaari et al. |
| 6,535,736 | B1 | 3/2003 | Balogh et al. |
| 6,539,030 | B1 | 3/2003 | Bender et al. |
| 6,560,774 | B1 | 5/2003 | Gordon et al. |
| 6,563,807 | B1 | 5/2003 | Kim et al. |
| 6,570,915 | B1 | 5/2003 | Sweitzer et al. |
| 6,571,084 | B1 | 5/2003 | Jabbary |
| 6,577,608 | B1 | 6/2003 | Moon et al. |
| 6,580,726 | B1 | 6/2003 | Kumpf et al. |
| 6,597,705 | B1 | 7/2003 | Rezaiifar et al. |
| 6,597,923 | B1 | 7/2003 | Vanghi et al. |
| 6,603,746 | B1 | 8/2003 | Larijani et al. |
| 6,628,956 | B2 | 9/2003 | Bark et al. |
| 6,633,554 | B1 | 10/2003 | Dalal |
| 6,643,520 | B1 | 11/2003 | Park et al. |
| 6,684,080 | B1 | 1/2004 | Barnes et al. |
| 6,687,285 | B1 | 2/2004 | Jou |
| 6,711,150 | B1 | 3/2004 | Vanghi |
| 6,714,511 | B1 | 3/2004 | Sudo et al. |
| 6,721,373 | B1 | 4/2004 | Frenkel et al. |
| 6,731,943 | B1 | 5/2004 | McCormick et al. |
| 6,754,229 | B1 | 6/2004 | Islam et al. |
| 6,788,937 | B1 | 9/2004 | Willenegger et al. |
| 6,795,425 | B1 | 9/2004 | Raith |
| 6,807,164 | B1 | 10/2004 | Almgren et al. |
| 6,813,252 | B2 | 11/2004 | Chang et al. |
| 6,813,269 | B1 | 11/2004 | Clougherty et al. |
| 6,823,192 | B2 | 11/2004 | Jou et al. |
| 6,829,493 | B1 | 12/2004 | Hunzinger |
| 6,842,619 | B2 | 1/2005 | Lee et al. |
| 6,850,499 | B2 | 2/2005 | Wheatley, III |
| 6,928,293 | B2 | 8/2005 | Park et al. |
| 6,937,700 | B1 | 8/2005 | Jang |
| 6,944,146 | B1 * | 9/2005 | Barany et al. ............ 370/338 |
| 6,950,669 | B2 | 9/2005 | Simonsson |
| 6,952,591 | B2 | 10/2005 | Budka et al. |
| 6,963,540 | B2 | 11/2005 | Choi et al. |
| 6,967,936 | B1 | 11/2005 | Laroia et al. |
| 6,996,131 | B1 | 2/2006 | Islam et al. |
| 6,996,391 | B2 | 2/2006 | Hunzinger |
| 7,006,477 | B1 | 2/2006 | Balachandran et al. |
| 7,046,966 | B2 | 5/2006 | Davis |
| 7,058,031 | B2 | 6/2006 | Bender et al. |
| 7,072,307 | B2 | 7/2006 | Tong et al. |
| 7,099,299 | B2 | 8/2006 | Liang et al. |
| 7,110,391 | B1 | 9/2006 | Rogers et al. |
| 7,139,575 | B1 | 11/2006 | Chen et al. |
| 7,197,692 | B2 | 3/2007 | Sutivong et al. |
| 7,203,512 | B2 | 4/2007 | Jeong et al. |
| 7,212,831 | B2 | 5/2007 | Lee |
| 7,224,993 | B2 | 5/2007 | Meyers et al. |
| 7,233,625 | B2 | 6/2007 | Ma et al. |
| 7,313,167 | B2 | 12/2007 | Yoon et al. |
| 7,313,398 | B1 | 12/2007 | Ramahi |
| 7,320,003 | B2 | 1/2008 | Perry et al. |
| 7,336,953 | B2 | 2/2008 | Kim et al. |
| 7,340,615 | B2 | 3/2008 | Krantz et al. |
| 7,342,901 | B1 | 3/2008 | Zhang et al. |
| 7,383,432 | B1 * | 6/2008 | Barnes et al. ............ 713/151 |
| 7,403,528 | B2 | 7/2008 | Hu et al. |
| 7,415,041 | B2 | 8/2008 | Harris |
| 7,420,939 | B2 | 9/2008 | Laroia et al. |
| 7,466,665 | B2 | 12/2008 | Calcev et al. |
| 7,496,058 | B2 | 2/2009 | Kim et al. |
| 7,522,919 | B2 | 4/2009 | Yoon et al. |
| 7,567,826 | B2 | 7/2009 | Sugaya |
| 7,590,095 | B2 | 9/2009 | Chen et al. |
| 7,620,018 | B2 | 11/2009 | Tee et al. |
| 7,742,444 | B2 | 6/2010 | Mese et al. |
| 7,768,960 | B1 | 8/2010 | Barratt |
| 7,782,807 | B2 | 8/2010 | Yoon et al. |
| 7,782,831 | B1 | 8/2010 | Feeney |
| 7,818,013 | B2 | 10/2010 | Li et al. |
| 7,852,793 | B2 | 12/2010 | Prakash |
| 7,855,976 | B2 | 12/2010 | Sampath |
| 7,881,245 | B2 | 2/2011 | Vijayan et al. |
| 7,924,800 | B2 | 4/2011 | Sampath |
| 7,933,219 | B2 | 4/2011 | Naguib |
| 7,957,483 | B2 | 6/2011 | Yu et al. |
| 7,987,505 | B2 | 7/2011 | Vadlapudi et al. |
| 8,000,257 | B2 | 8/2011 | An et al. |
| 8,000,407 | B2 | 8/2011 | Prakash |
| 8,014,749 | B2 | 9/2011 | Prakash |
| 8,027,302 | B2 | 9/2011 | Prakash et al. |
| 8,032,145 | B2 | 10/2011 | Ji |
| 8,036,669 | B2 | 10/2011 | Dong et al. |
| 8,078,135 | B2 | 12/2011 | Prakash et al. |
| 8,089,893 | B2 | 1/2012 | Naguib |
| 8,107,421 | B2 | 1/2012 | Prakash et al. |
| 8,169,889 | B2 | 5/2012 | Walton et al. |
| 8,184,574 | B2 | 5/2012 | Sutivong et al. |
| 8,199,661 | B2 | 6/2012 | Barriac |
| 8,218,479 | B2 | 7/2012 | Barriac |
| 8,238,289 | B2 | 8/2012 | Prakash et al. |
| 8,248,950 | B2 | 8/2012 | Ulupinar et al. |
| 8,265,066 | B2 | 9/2012 | Prakash et al. |
| 8,411,621 | B2 | 4/2013 | Barriac |

(56) References Cited

U.S. PATENT DOCUMENTS

| | | | |
|---|---|---|---|
| 8,477,808 B2 | 7/2013 | Prakash et al. | |
| 8,599,712 B2 | 12/2013 | Sampath | |
| 2001/0029181 A1 | 10/2001 | Verkama | |
| 2001/0034233 A1 | 10/2001 | Tiedemann, Jr. et al. | |
| 2001/0054959 A1 | 12/2001 | Horn et al. | |
| 2002/0003780 A1 | 1/2002 | Braun et al. | |
| 2002/0018010 A1 | 2/2002 | Le | |
| 2002/0018450 A1 | 2/2002 | McKenna et al. | |
| 2002/0022487 A1* | 2/2002 | Ahn | 455/453 |
| 2002/0037716 A1 | 3/2002 | McKenna et al. | |
| 2002/0058528 A1 | 5/2002 | Hunzinger | |
| 2002/0061749 A1 | 5/2002 | Hunzinger | |
| 2002/0087720 A1 | 7/2002 | Davis et al. | |
| 2002/0093920 A1 | 7/2002 | Neufeld et al. | |
| 2002/0101837 A1 | 8/2002 | Bender et al. | |
| 2002/0111158 A1 | 8/2002 | Tee | |
| 2002/0123358 A1 | 9/2002 | Butler et al. | |
| 2002/0126641 A1 | 9/2002 | Bender | |
| 2002/0136286 A1 | 9/2002 | Koo | |
| 2002/0137535 A1 | 9/2002 | Hunzinger | |
| 2002/0142776 A1 | 10/2002 | Tiedemann, Jr. | |
| 2002/0154610 A1 | 10/2002 | Tiedemann, Jr. et al. | |
| 2002/0155852 A1 | 10/2002 | Bender | |
| 2002/0163894 A1 | 11/2002 | Alapuranen et al. | |
| 2002/0168984 A1 | 11/2002 | Wallentin | |
| 2002/0181423 A1* | 12/2002 | Chen et al. | 370/337 |
| 2002/0181509 A1 | 12/2002 | Mody et al. | |
| 2003/0016702 A1 | 1/2003 | Bender et al. | |
| 2003/0031140 A1 | 2/2003 | Oprescu-Surcobe et al. | |
| 2003/0039267 A1 | 2/2003 | Koo et al. | |
| 2003/0058818 A1 | 3/2003 | Wilkes et al. | |
| 2003/0072452 A1 | 4/2003 | Mody | |
| 2003/0086366 A1 | 5/2003 | Branlund et al. | |
| 2003/0086385 A1 | 5/2003 | Kwon et al. | |
| 2003/0112829 A1 | 6/2003 | Sridhar | |
| 2003/0115369 A1 | 6/2003 | Walter et al. | |
| 2003/0123383 A1 | 7/2003 | Korobkov et al. | |
| 2003/0133494 A1 | 7/2003 | Bender et al. | |
| 2003/0144000 A1 | 7/2003 | Glazko et al. | |
| 2003/0152049 A1 | 8/2003 | Turner | |
| 2003/0179727 A1 | 9/2003 | Soong et al. | |
| 2003/0189932 A1 | 10/2003 | Ishikawa et al. | |
| 2003/0207692 A1 | 11/2003 | Goldberg | |
| 2003/0218973 A1 | 11/2003 | Oprea et al. | |
| 2003/0232621 A1 | 12/2003 | Brooks | |
| 2004/0002340 A1 | 1/2004 | Lim et al. | |
| 2004/0038681 A1 | 2/2004 | Chun | |
| 2004/0077370 A1 | 4/2004 | Dick et al. | |
| 2004/0081131 A1 | 4/2004 | Walton et al. | |
| 2004/0082356 A1 | 4/2004 | Walton et al. | |
| 2004/0121771 A1 | 6/2004 | Song et al. | |
| 2004/0121774 A1 | 6/2004 | Rajkotia et al. | |
| 2004/0127244 A1 | 7/2004 | Matsumoto et al. | |
| 2004/0143791 A1 | 7/2004 | Ito et al. | |
| 2004/0146030 A1 | 7/2004 | Hsieh et al. | |
| 2004/0151231 A1 | 8/2004 | Li et al. | |
| 2004/0151264 A1 | 8/2004 | Montojo et al. | |
| 2004/0152481 A1 | 8/2004 | Georgeaux et al. | |
| 2004/0160922 A1 | 8/2004 | Nanda et al. | |
| 2004/0174928 A1 | 9/2004 | Siwiak et al. | |
| 2004/0180661 A1 | 9/2004 | Chen et al. | |
| 2004/0185879 A1 | 9/2004 | Kong et al. | |
| 2004/0193971 A1 | 9/2004 | Soong et al. | |
| 2004/0203855 A1 | 10/2004 | Veerasamy et al. | |
| 2004/0213214 A1 | 10/2004 | Jung et al. | |
| 2004/0221218 A1 | 11/2004 | Grob et al. | |
| 2004/0229605 A1 | 11/2004 | Hwang et al. | |
| 2004/0252659 A1 | 12/2004 | Yun et al. | |
| 2004/0258096 A1 | 12/2004 | Yoon et al. | |
| 2004/0259528 A1 | 12/2004 | Gandhi et al. | |
| 2004/0264548 A1 | 12/2004 | Miyoshi | |
| 2005/0002370 A1 | 1/2005 | An et al. | |
| 2005/0030911 A1 | 2/2005 | Tiedemann, Jr. et al. | |
| 2005/0031047 A1 | 2/2005 | Maltsev et al. | |
| 2005/0047361 A1 | 3/2005 | Fudim et al. | |
| 2005/0049013 A1 | 3/2005 | Chang et al. | |
| 2005/0054389 A1 | 3/2005 | Lee et al. | |
| 2005/0058089 A1 | 3/2005 | Vijayan et al. | |
| 2005/0063298 A1 | 3/2005 | Ling et al. | |
| 2005/0078641 A1 | 4/2005 | Kim | |
| 2005/0094576 A1 | 5/2005 | Fonseca, Jr. et al. | |
| 2005/0111397 A1 | 5/2005 | Attar et al. | |
| 2005/0111406 A1 | 5/2005 | Pasanen et al. | |
| 2005/0113023 A1 | 5/2005 | Bassompiere et al. | |
| 2005/0117537 A1 | 6/2005 | Okabe | |
| 2005/0118981 A1 | 6/2005 | Laroia et al. | |
| 2005/0124358 A1 | 6/2005 | Willey | |
| 2005/0124362 A1 | 6/2005 | Pecen et al. | |
| 2005/0128964 A1 | 6/2005 | Tiedemann, Jr. et al. | |
| 2005/0128993 A1 | 6/2005 | Yu et al. | |
| 2005/0135282 A1 | 6/2005 | Miyoshi et al. | |
| 2005/0135308 A1 | 6/2005 | Vijayan et al. | |
| 2005/0135403 A1 | 6/2005 | Ketchum et al. | |
| 2005/0152328 A1 | 7/2005 | Sadri et al. | |
| 2005/0157802 A1 | 7/2005 | Park et al. | |
| 2005/0163258 A1 | 7/2005 | Gore et al. | |
| 2005/0164709 A1 | 7/2005 | Balasubramanian et al. | |
| 2005/0165949 A1 | 7/2005 | Teague | |
| 2005/0180312 A1 | 8/2005 | Walton et al. | |
| 2005/0180362 A1 | 8/2005 | Chin et al. | |
| 2005/0190724 A1 | 9/2005 | Hansen et al. | |
| 2005/0201309 A1 | 9/2005 | Kang et al. | |
| 2005/0221833 A1 | 10/2005 | Granzow et al. | |
| 2005/0232181 A1 | 10/2005 | Park et al. | |
| 2005/0233729 A1 | 10/2005 | Stojanovski et al. | |
| 2005/0249181 A1 | 11/2005 | Vijayan et al. | |
| 2005/0249187 A1 | 11/2005 | Cho et al. | |
| 2005/0265346 A1 | 12/2005 | Ho et al. | |
| 2005/0266846 A1 | 12/2005 | Kim | |
| 2005/0271027 A1 | 12/2005 | Kim et al. | |
| 2005/0281226 A1 | 12/2005 | Lee et al. | |
| 2005/0281269 A1 | 12/2005 | Choi | |
| 2006/0014542 A1 | 1/2006 | Khandekar et al. | |
| 2006/0018249 A1 | 1/2006 | Shearer et al. | |
| 2006/0019677 A1 | 1/2006 | Teague et al. | |
| 2006/0019694 A1 | 1/2006 | Sutivong et al. | |
| 2006/0034208 A1 | 2/2006 | Blouin | |
| 2006/0034244 A1 | 2/2006 | Huang et al. | |
| 2006/0046762 A1 | 3/2006 | Yoon et al. | |
| 2006/0050637 A1 | 3/2006 | Wigard et al. | |
| 2006/0062183 A1 | 3/2006 | Forte et al. | |
| 2006/0084432 A1 | 4/2006 | Balasubramanian et al. | |
| 2006/0098599 A1 | 5/2006 | Choi et al. | |
| 2006/0099972 A1 | 5/2006 | Nair et al. | |
| 2006/0129816 A1 | 6/2006 | Hinton | |
| 2006/0133409 A1 | 6/2006 | Prakash et al. | |
| 2006/0148493 A1 | 7/2006 | Narasimha et al. | |
| 2006/0183483 A1 | 8/2006 | Hidaka | |
| 2006/0187877 A1 | 8/2006 | Lundby et al. | |
| 2006/0193287 A1 | 8/2006 | Ooshima et al. | |
| 2006/0194581 A1 | 8/2006 | Kang et al. | |
| 2006/0205413 A1 | 9/2006 | Teague | |
| 2006/0223449 A1* | 10/2006 | Sampath et al. | 455/69 |
| 2006/0227891 A1 | 10/2006 | Niu et al. | |
| 2006/0245425 A1 | 11/2006 | Mathis et al. | |
| 2006/0268768 A1 | 11/2006 | Harris et al. | |
| 2006/0280160 A1 | 12/2006 | Padovani et al. | |
| 2006/0285485 A1 | 12/2006 | Agrawal et al. | |
| 2006/0285558 A1 | 12/2006 | Dottling et al. | |
| 2006/0286974 A1 | 12/2006 | Gore et al. | |
| 2006/0291577 A1 | 12/2006 | Boariu | |
| 2007/0003113 A1 | 1/2007 | Goldberg et al. | |
| 2007/0015523 A1 | 1/2007 | Prakash et al. | |
| 2007/0022441 A1 | 1/2007 | Nystrom et al. | |
| 2007/0060126 A1 | 3/2007 | Taniguchi et al. | |
| 2007/0064588 A1 | 3/2007 | Kisoda et al. | |
| 2007/0076682 A1 | 4/2007 | Kim et al. | |
| 2007/0087767 A1 | 4/2007 | Pareek et al. | |
| 2007/0091817 A1 | 4/2007 | Yoon et al. | |
| 2007/0097935 A1 | 5/2007 | Gorokhov et al. | |
| 2007/0110000 A1 | 5/2007 | Abedi | |
| 2007/0121535 A1 | 5/2007 | Chen et al. | |
| 2007/0133476 A1 | 6/2007 | Li et al. | |
| 2007/0147226 A1 | 6/2007 | Khandekar et al. | |

(56) References Cited

U.S. PATENT DOCUMENTS

| | | |
|---|---|---|
| 2007/0159957 A1 | 7/2007 | Ljung et al. |
| 2007/0217387 A1 | 9/2007 | Choi et al. |
| 2008/0056183 A1 | 3/2008 | Gorokhov et al. |
| 2008/0056188 A1 | 3/2008 | Lu et al. |
| 2008/0076432 A1 | 3/2008 | Senarath et al. |
| 2008/0117842 A1 | 5/2008 | Rao |
| 2008/0123542 A1 | 5/2008 | Karlsson |
| 2008/0187064 A1 | 8/2008 | Miyoshi |
| 2008/0188214 A1 | 8/2008 | Qi |
| 2008/0259811 A1 | 10/2008 | Cordeiro et al. |
| 2008/0271138 A1 | 10/2008 | Chen et al. |
| 2008/0293421 A1 | 11/2008 | Ulupinar et al. |
| 2008/0310357 A1 | 12/2008 | Ulupinar et al. |
| 2008/0311908 A1 | 12/2008 | Prakash et al. |
| 2009/0034445 A1 | 2/2009 | Prakash et al. |
| 2009/0046640 A1 | 2/2009 | Prakash et al. |
| 2009/0046699 A1 | 2/2009 | Prakash |
| 2009/0067547 A1 | 3/2009 | Ulupinar et al. |
| 2009/0086758 A1 | 4/2009 | Prakash et al. |
| 2009/0097437 A1 | 4/2009 | Sutivong et al. |
| 2009/0098841 A1 | 4/2009 | Prakash et al. |
| 2009/0103507 A1* | 4/2009 | Gu et al. ............... 370/342 |
| 2009/0129325 A1 | 5/2009 | Prakash et al. |
| 2009/0135768 A1 | 5/2009 | Barriac |
| 2009/0147693 A1 | 6/2009 | Teague et al. |
| 2009/0147712 A1 | 6/2009 | Prakash et al. |
| 2009/0147713 A1 | 6/2009 | Prakash |
| 2009/0147729 A1 | 6/2009 | Ulupinar et al. |
| 2009/0147730 A1 | 6/2009 | Ulupinar et al. |
| 2009/0147739 A1 | 6/2009 | Barriac |
| 2009/0149172 A1 | 6/2009 | Prakash et al. |
| 2009/0156207 A1 | 6/2009 | Prakash |
| 2009/0161775 A1 | 6/2009 | Prakash et al. |
| 2009/0164609 A1 | 6/2009 | Prakash et al. |
| 2009/0164658 A1 | 6/2009 | Prakash |
| 2009/0175217 A1 | 7/2009 | Prakash |
| 2009/0180424 A1 | 7/2009 | Prakash et al. |
| 2009/0201833 A1 | 8/2009 | Khandekar |
| 2009/0207744 A1 | 8/2009 | Ulupinar et al. |
| 2009/0207790 A1 | 8/2009 | Ulupinar et al. |
| 2009/0207830 A1 | 8/2009 | Prakash |
| 2009/0213788 A1 | 8/2009 | Prakash et al. |
| 2009/0213789 A1 | 8/2009 | Khandekar et al. |
| 2009/0213790 A1 | 8/2009 | Barriac |
| 2009/0213791 A1 | 8/2009 | Prakash |
| 2009/0219840 A1 | 9/2009 | Barriac |
| 2009/0219845 A1 | 9/2009 | Prakash |
| 2009/0219866 A1 | 9/2009 | Prakash et al. |
| 2009/0219867 A1 | 9/2009 | Barriac |
| 2009/0219887 A1 | 9/2009 | Barriac |
| 2009/0219917 A1 | 9/2009 | Prakash et al. |
| 2009/0220033 A1 | 9/2009 | Palanki et al. |
| 2009/0221305 A1 | 9/2009 | Ulupinar et al. |
| 2009/0222698 A1 | 9/2009 | Prakash et al. |
| 2009/0258648 A1 | 10/2009 | Willey |
| 2009/0303890 A1 | 12/2009 | Prakash |
| 2009/0305664 A1 | 12/2009 | Prakash |
| 2009/0316632 A1 | 12/2009 | Prakash |
| 2010/0002597 A1 | 1/2010 | Sampath et al. |
| 2010/0034101 A1 | 2/2010 | Ayman Naguib |
| 2010/0046423 A1 | 2/2010 | Prakash et al. |
| 2010/0069107 A1 | 3/2010 | Mese et al. |
| 2010/0110976 A1 | 5/2010 | Prakash et al. |
| 2010/0150106 A1 | 6/2010 | Barriac |
| 2010/0215030 A1 | 8/2010 | Agrawal et al. |
| 2010/0232293 A1 | 9/2010 | Sagfors et al. |
| 2011/0173464 A1 | 7/2011 | Prakash et al. |
| 2011/0199996 A1 | 8/2011 | Zhang et al. |
| 2011/0280183 A1 | 11/2011 | Sampath |
| 2013/0010755 A1 | 1/2013 | Barriac |

FOREIGN PATENT DOCUMENTS

| | | |
|---|---|---|
| CN | 1350730 A | 5/2002 |
| CN | 1666448 A | 9/2005 |
| CN | 1496636 | 7/2006 |
| EP | 0475698 A2 | 3/1992 |
| EP | 0687078 A2 | 12/1995 |
| EP | 0869647 A2 | 10/1998 |
| EP | 0955736 A2 | 11/1999 |
| EP | 1052866 | 11/2000 |
| EP | 1124347 A2 | 8/2001 |
| EP | 1158685 A1 | 11/2001 |
| EP | 1202591 A2 | 5/2002 |
| EP | 1223775 | 7/2002 |
| EP | 1315310 A2 | 5/2003 |
| EP | 1388964 A1 | 2/2004 |
| EP | 1458209 A2 | 9/2004 |
| EP | 1471760 | 10/2004 |
| EP | 1487230 | 12/2004 |
| EP | 1496632 A1 | 1/2005 |
| EP | 1513282 A2 | 3/2005 |
| EP | 1534039 | 5/2005 |
| EP | 1004217 | 6/2005 |
| EP | 1587233 | 10/2005 |
| EP | 1678906 | 7/2006 |
| EP | 1714416 | 10/2006 |
| EP | 1583309 B1 | 5/2007 |
| EP | 1949730 | 7/2008 |
| JP | 0722998 | 1/1995 |
| JP | 7504552 T | 5/1995 |
| JP | 7226724 A2 | 8/1995 |
| JP | 8172671 | 7/1996 |
| JP | 8242218 A | 9/1996 |
| JP | 9509547 | 9/1997 |
| JP | 10155179 A | 6/1998 |
| JP | 10242903 A | 9/1998 |
| JP | 11313370 A | 11/1999 |
| JP | 2000506343 A | 5/2000 |
| JP | 2000232688 A | 8/2000 |
| JP | 2001512638 T | 8/2001 |
| JP | 2001274767 | 10/2001 |
| JP | 2002010341 A | 1/2002 |
| JP | 2002026795 A | 1/2002 |
| JP | 2002152129 A | 5/2002 |
| JP | 2002158609 A | 5/2002 |
| JP | 2002300628 | 10/2002 |
| JP | 2002305534 A | 10/2002 |
| JP | 2002539707 | 11/2002 |
| JP | 2002540692 | 11/2002 |
| JP | 2003500891 T | 1/2003 |
| JP | 2003110582 A | 4/2003 |
| JP | 2003517741 T | 5/2003 |
| JP | 2003525555 | 8/2003 |
| JP | 2003309533 | 10/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004247985 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2004012806 A | 1/2005 |
| JP | 2005502218 T | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005160079 A | 6/2005 |
| JP | 2005233621 A | 9/2005 |
| JP | 2005286998 A | 10/2005 |
| JP | 2006523392 A | 10/2006 |
| JP | 2007501580 T | 1/2007 |
| KR | 20010016706 | 3/2001 |
| KR | 1020010082061 | 8/2001 |
| KR | 1020030007481 | 1/2003 |
| KR | 20040007214 | 1/2004 |

(56) References Cited

FOREIGN PATENT DOCUMENTS

| | | |
|---|---|---|
| KR | 20040050145 | 6/2004 |
| KR | 20050053787 | 6/2005 |
| KR | 20060014618 A | 2/2006 |
| RU | 2073913 C1 | 2/1997 |
| RU | 2198465 C2 | 9/2002 |
| TW | 478269 | 3/2002 |
| TW | 531982 | 5/2003 |
| TW | 200302642 | 8/2003 |
| TW | I223532 | 11/2004 |
| TW | I223944 | 11/2004 |
| TW | 200501641 | 1/2005 |
| TW | I239782 | 9/2005 |
| TW | I240524 | 9/2005 |
| WO | WO2005067173 A1 | 0/5020 |
| WO | WO9318601 A1 | 9/1993 |
| WO | WO9730531 A1 | 8/1997 |
| WO | WO9733399 A1 | 9/1997 |
| WO | WO9835520 | 8/1998 |
| WO | WO9839938 | 9/1998 |
| WO | WO9848581 A1 | 10/1998 |
| WO | WO9854919 | 12/1998 |
| WO | WO9854919 A2 | 12/1998 |
| WO | WO9943101 | 8/1999 |
| WO | WO0007260 A2 | 2/2000 |
| WO | WO0010353 A1 | 2/2000 |
| WO | WO0013451 | 3/2000 |
| WO | WO0014900 A1 | 3/2000 |
| WO | WO0018173 | 3/2000 |
| WO | WO0035107 | 6/2000 |
| WO | WO0055976 A2 | 9/2000 |
| WO | WO0057662 | 9/2000 |
| WO | WO0057663 | 9/2000 |
| WO | WO0113669 A1 | 2/2001 |
| WO | WO0117288 A1 | 3/2001 |
| WO | WO0120808 A2 | 3/2001 |
| WO | WO0160104 | 8/2001 |
| WO | WO0176110 A2 | 10/2001 |
| WO | WO0176279 | 10/2001 |
| WO | WO0182504 | 11/2001 |
| WO | WO0197538 | 12/2001 |
| WO | WO0228120 A2 | 4/2002 |
| WO | WO0243412 | 5/2002 |
| WO | WO0247321 | 6/2002 |
| WO | WO0249305 A2 | 6/2002 |
| WO | WO02073867 | 9/2002 |
| WO | WO02080600 | 10/2002 |
| WO | WO02093839 | 11/2002 |
| WO | WO03015435 | 2/2003 |
| WO | WO03043251 | 5/2003 |
| WO | WO03051076 | 6/2003 |
| WO | WO03069933 | 8/2003 |
| WO | WO2004004173 | 1/2004 |
| WO | WO2004032548 A1 | 4/2004 |
| WO | WO2004032559 | 4/2004 |
| WO | WO2004038984 A2 | 5/2004 |
| WO | WO2004038988 | 5/2004 |
| WO | WO2004054206 A1 | 6/2004 |
| WO | WO2004073200 | 8/2004 |
| WO | WO2004077752 | 9/2004 |
| WO | WO2004077778 A1 | 9/2004 |
| WO | WO2004079949 A1 | 9/2004 |
| WO | WO2004082181 A1 | 9/2004 |
| WO | WO2004086711 | 10/2004 |
| WO | WO2004091231 | 10/2004 |
| WO | WO2004100450 A1 | 11/2004 |
| WO | WO2004107796 | 12/2004 |
| WO | WO2005004525 | 1/2005 |
| WO | WO2005022811 | 3/2005 |
| WO | WO2005027355 A2 | 3/2005 |
| WO | WO2005034438 | 4/2005 |
| WO | WO2005039128 | 4/2005 |
| WO | WO2005041515 | 5/2005 |
| WO | WO-2005048517 A1 | 5/2005 |
| WO | WO2005055640 A1 | 6/2005 |
| WO | WO2005060277 | 6/2005 |
| WO | WO2005064875 | 7/2005 |
| WO | WO2005067181 A1 | 7/2005 |
| WO | WO2005071989 | 8/2005 |
| WO | WO2005074184 | 8/2005 |
| WO | WO2005079081 A1 | 8/2005 |
| WO | WO2005081444 A1 | 9/2005 |
| WO | WO2005096560 A1 | 10/2005 |
| WO | WO2006007318 A1 | 1/2006 |
| WO | WO2006023705 | 3/2006 |
| WO | 2006069176 A2 | 6/2006 |
| WO | WO2006069320 | 6/2006 |
| WO | WO2006099062 A1 | 9/2006 |
| WO | 06109492 | 10/2006 |
| WO | WO2006138556 | 12/2006 |
| WO | WO2006138573 | 12/2006 |
| WO | WO2007050876 | 5/2007 |
| WO | WO2007050939 | 5/2007 |

OTHER PUBLICATIONS

3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.
3GPP2 "cdma2000 High Rate Packet Data Air interface Specification",3rd Generation Partnership Project 2 C.S0024, Sep. 12, 2000, pp. 1-417.
3GPP2 C: "cdma2000 High Rate Packet Data Air Interface Specification; 3GPP2 C.S0024-A version 2.0," 3GPP2 CDMA2000, Jul. 2005, p. 0, 8-13-8-15, 8-101, XP002426056, p. 8-13, line 17-line 35; p. 8-14, line 15-line 32; p. 8-15, line 4-line 12; p. 8-101, line 30-line 32.
3GPP2. "cdma2000 High Rate Packet Data Air Interface Specification", Chapter 9—"Connection Layer", C.S0024-A, Version 1.0, Mar. 2004, 144 pages, XP002424014.
3GPP2, "cdma2000 High Rate Packet Data Air Interface Specification", C. S0024-A Version 2.0, Oct. 27, 2000, 441 pages.
3GPP2 C.S0024-0—Version 4.0 "cdma2000 High Rate Packet Data Air Interface Specification" , p. 1-548, Oct. 25, 2002.
3GPP2 C.S0024-A, Version 2.0—3rd Generation Partnership Project 2; "CDMA2000 High Rate Packet Data Air Interface Specification"; Jul. 2005, 1227 pages; XP002431799.
3rd Generation Partnership Project 2 "3GPP2": Medium Access Control (MAC) Standard for cdma2000 Spread Spectrum Systems, Release D; 3GPP2 CS0003-D Version 2.0, Sep. 2005 (pp. 1-230) XP002429116.
3rd Generation Partnership Project 2 "3GPP2": "Signaling Link Access Control (LAC) Standard for cdma200 Spread Spectrum Systems Revision D v2.0" 3GPP2 C.S0004-D Version 2.0, Sep. 2005, XP002427509, pp. 1-12, pp. 2-46-pp. 2-51.
Agilent Technologies: Performing Base Station Over-Air Maintenance with the Agilent E6474A CDMA , Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.
Chinese OA dated Nov. 30, 2010 for CN Applcation Serial No. 200680049404.3, 8 pages.
Chinese Office Action dated Nov. 12, 2010 for Chinese Patent Application Serial No. 200680049463.0, 7 pages.
Chinese Office Action dated Sep. 6, 2010, for Chinese Patent Application Serial No. 200680049310.6, 5 pages.
Chinese Office Action for CN Application No. 200680049744.6 dated Sep. 9, 2010, 4 pages.
Chinese Office action mailed Sep. 8, 2010 for Chinese patent application No. 200680049451.8, 2 pages.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
English Translation of Korean Office Action mailed Aug. 31, 2010 for Korean Patent Application No. 2008-7012604, 3 pages.
English Translation of the Chinese Office Action dated Aug. 31, 2010 for Chinese Patent Application Serial No. 2006-80049431.0, 2 pages.
EP OA dated Oct. 4, 2010 for European Application Serial No. 06827070.1, 4 pages.

(56) References Cited

OTHER PUBLICATIONS

EP OA dated Feb. 19, 2009 for EP Application Serial No. 06836638.4-2411211 pages.
EP OA dated Feb. 20, 2009 for EP Application Serial No. 06 827 070.1-2412, 5 pages.
EP OA dated Mar. 17, 2009 for European Application No. 06 826 886.1-2412, 10 pages.
EP OA dated Mar. 17, 2009 for European Application No. 06 827 080.0-2412, 6 pages.
EP OA dated Oct. 4, 2010 for EP Application Serial No. 06836638.4, 4 pages.
EP Office Action for European Patent Application 06836548.5 dated Mar. 3, 2010; pp. 4.
European OA dated Oct. 5, 2010 for European Application Serial No. 06836689.7-2412, 4 pages.
European OA dated Feb. 19, 2009 for European Application Serial No. 06 836 689.7-2412, 6 pages.
European OA dated Feb. 20, 2009 for European Application Serial No. 06 826 915.8-2412, 5 pages.
European OA dated May 14, 2009 for US Application Serial No. 06 826 883.8-1237, 4 pages.
European OA dated Sep. 9, 2008 for EP Application Serial No. 06 826 733.5-2412, 2 pages.
European OA dated May 14, 2009 for EP Application Serial No. 06 827 064A-1237, 4 pages.
European Office Action dated Sep. 24, 2010, for European Patent Application Serial No. 06826919.0, 4 pages.
European Office Action dated Sep. 24, 2010, for European Patent Application Serial No. 06836656.6, 4 pages.
European Office Action Dated August 21, 2008 for European Application Serial No. 068271782, 3 Pages.
European Office Action dated Dec. 14, 2009, for European Patent Application Serial No. 06826816.8, 2 pages.
European Office Action dated Dec. 18, 2009, for European Patent Application Serial No. 06826807.7, 4 pages.
European Office Action dated Jun. 10, 2010 for European Patent Application Serial No. 06827080.0, 5 pages.
European Office Action dated Oct. 4, 2010, for European Patent Application Serial No. 06826853.1, 7 pages.
European Office Action dated Sep. 17, 2008, for European Patent Application Serial No. 06826807.7, 6 pages.
European Office Action dated Sep. 24, 2010, for EP Patent Application Serial No. 06826849.9, 4 pages.
European Office Action for European Application No. 06827130.3-2412 dated Sep. 24, 2010, 4 pages.
European Office Action mailed Sep. 24, 2010 for European Patent Application No. 06844225.0, 4 pages.
European Patent Office Action dated Apr. 12, 2010 for EP Application Serial No. 06817409.3, 4 pages.
European Search Report mailed Nov. 29, 2010 for European Application No. 10152463.5-2413, 6 pages.
IEEE 802.20 Working Group on Mobile Broadband Wireless Access; QFDD and QTDD: Proposed Draft Air Interface Specification; IEEE C802.20-05/69, Oct. 28, 2005, retrieved from the internet on Mar. 5, 2007, pp. 6-43-6-44, XP002425098, http://ieee802.org/20/Contributions.html. Last accessed May 24, 2008, 624 pages.
IEEE: "Draft IEEE Standard for Local and metropolitan area networks, Part 16: Air Interface for Fixed Broadband WirelessAccess-Systems,chapters:6.3.2.3,6.3.15-6.3.17,8.2.1.4-8.2.1.11,8.3.5-8.4.5,8.4.11,11". IEEEP802.16—REVDID5, May 2004, XP002423445.
International Search Report and Written Opinion—PCT/US2006/042226, International Search Authority—European Patent Office—Feb. 26, 2007.
Japanese OA dated Dec. 21, 2010 for JP Application Serial No. 2008538094, 6 pages.
Japanese OA dated Dec. 7, 2010 for Japanese Application Serial No. 2008-538097, 3 pages.
Japanese Office Action mailed Dec. 7, 2010 for Japanese Patent Application Serial No. 2008-537990,3 pages.
Jeon et al., An enhanced channel-quality indication (CQI) reporting scheme for HSDPA systems, IEEE Communication letters, May 2005, vol. 9, pp. 432-434.
Jim Tomcik, "C802.20-05/69: QFDD and QTDD: Proposed Draft Air Interface Specification". Contributions to IEEE 802.20 Session 17: Nov. 14-17, 2005; Oct. 28, 2010; pp. 1-624; XP002423945. http://ieee802.org/20/Contributions.html.
Jim Tomcik, et al., MBFDD and MBTDD: Proposed Draft Air Interface Specification. IEEE 802.20 Working Group on Mobile Broadband Wireless Access, Jan. 6, 2006; pp. 1-839; XP002426594. http://www.ieee802.org/20/Contribs/C802.20-06-04.pdf.
Jim Tomcik "MBFDD and MBTDD Wideband Mode : Technology Overview" Jan. 6, 2006 (109 pages) XP002422172 Retrieved from the Internet : URL: http://www.ieee802.org/20/contributions.html >.
Korean OA Dated Nov. 25, 2009 for KR Application Serial No:20087012719, 4 Pages.
Korean OA dated Jan. 26, 2010 for KR Application Serial No. 2008-7012552, 2pages.
Korean OA dated Dec. 9, 2009 for Korean Application Serial No. 2008-7012459, 3 pages.
Korean OA dated May 26, 2010 for Korean Application Serial No. 2008-7012459, 3 pages.
Korean Office Action dated Feb. 26, 2010 for Korean Application No. 2008-7012769, 3 pages.
Korean Office Action dated Apr. 28, 2010 for Korean Patent Application Serial No. 2008-7012762, 4 pages.
Korean Office Action Dated Apr. 30, 2010 for Korean Application Serial No. 2008-7012462, 3 Pages.
Korean Office Action dated Aug. 27, 2010 for Korean Patent Application Serial No. 2008-7012463, 3 pages.
Korean Office Action dated Aug. 27, 2010, for Korean Patent Application Serial No. 2008-7012474, 3 pages.
Korean Office Action dated Aug. 31, 2010 for Korean Patent Application Serial No. 2008-7012754, 3 pages.
Korean Office Action dated Aug. 31, 2010, for KR Patent Application Serial No. 2008-7012554, 3 pages.
Korean Office Action dated Dec. 24, 2009, for Korean Patent Application Serial No. 2008-7012465, 2 pages.
Korean Office Action dated Dec. 29, 2010 for Korean Patent Application Serial No. 2008-7012471, 3 pages.
Korean Office Action dated Dec. 9, 2009 for Korean Patent Application Serial No. 2008-7012471, 3 pages.
Korean Office Action dated Feb. 25, 2010 for Korean Patent Application Serial No. 2008-7012476, 4 pages.
Korean Office Action dated Feb. 25, 2010 for Korean Patent Application Serial No. 2008-7012754, 4 pages.
Korean Office Action dated Feb. 26, 2010, for KR Patent Application Serial No. 2008-7012554, 3 pages.
Korean Office Action dated Jan. 28, 2010 for Korean Patent Application Serial No. 2008-7012463, 4 pages.
Korean Office Action dated Jan. 28, 2010, for Korean Patent Application Serial No. 2008-7012474, 4 pages.
Korean Office Action dated Jan. 29, 2010, for Korean Patent Application Serial No. 2008-7012558, 3 pages.
Korean Office Action dated Jun. 28, 2010 for Korean Patent Application Serial No. 2008-7012471, 3 pages.
Korean Office Action Dated March 19, 2010, for Korean Patent Application Serial No. 2008-7012456, 4 Pages.
Korean Office Action dated Mar. 30, 2010 for Korean Application No. 2008-7012586; 3 pages.
Korean Office Action Dated March 30, 2010 for Korean Patent, Application Serial No. 2008/7012610, 3 Pages.
Korean Office Action dated Sep. 30, 2010 for Korean Application Serial No. 2010-7017046, 4 pages.
Korean Office Action for Korean Application No. 2008-7012687 dated Mar. 31, 2010, 4 pages.
Korean Office Action for Korean Application No. 2008-7012687 dated Sep. 30, 2010, 4 pages.
Korean Office Action for Korean Patent Application 2008-7012453 dated Jan. 27, 2010; pp. 3.
Korean Office Action for KR Application Serial No. 2008-7012764 dated Mar. 19, 2010, 4 pages.

(56) References Cited

OTHER PUBLICATIONS

Korean Office Action for KR Application Serial No. 2008-7012764 dated Aug. 27, 2010, 3 pages.
Korean Office Action from Korean Patent Application No. 2008-7012724 dated Apr. 27, 2010, pp. 3.
Korowajczuk L., et al, "Designing cdma2000 Systems", John Wiley & Sons, Inc., 2004, 34 pages.
"KR OA dated Aug. 25, 2010 for Korean Application Serial No. 2008-7012480, 2 pages.".
KR OA dated Jan. 29, 2010 for KR Application Serial No. 2008-7012603, 5 pages.
KR OA dated Jun. 28, 2010 for KR Application Serial No. 2008-7012603, 5 pages.
Liu Dawei, et al. "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA. vol. 1, pp. 170-171, XP010632240, ISBN: 0/7803-7547-5.http://ieeexplore.ieee.org/iel5/8402/26511/01180596.pdf?tp=&arnumber=1180596&isnumber=26511. Last accessed May 23, 2008, 2 pages.
Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet : URL:www.3gpp.org.
Notice of Grounds for Rejection for Korean Application No. 2008-7012768, dated Oct. 29, 2010 (English Translation).
OA dated Dec. 29, 2008 for European Application Serial No. 06826840.8, 3 pages.
OA dated Feb. 20, 2009 for European Application Serial No. 06 836 598.0-2414, 10 pages.
OA dated Jul. 1, 2009 for Korean Application Serial No. 2008-7012465, 9 pages.
OA mailed Feb. 26, 2010 for Korean Patent Application Serial No. 2008-7012649, 3 pages.
OA mailed Aug. 31, 2010 for Korean Patent Application Serial No. 2008-7012649, 3 pages.
Office Action for Chinese Application Serial No. 200680049342.6 dated Jun. 11, 2010, 5 pages.
"Office Action for Korean Application Serial No. 2008-7012756 dated Jul. 29, 2010, 2 pages.".
Office Action for Korean Patent Application No. 2008-7012556 dated Apr. 30 ,2010, 2 pages.
Office Action for Korean Patent Application Serial No. 2008-7012768 dated Apr. 28, 2010, 4 pages.
Office Action mailed Mar. 15, 2010 for Korean Patent Application No. 20087012580, 3 pages.
Office Action mailed Jul. 29, 2010 for Korean Patent Application No. 20087012580, 3 pages.
Office Action mailed Jan. 25, 2010 for Korean Patent Application No. 2008-7012767 3 pages.
Office Action mailed Jan. 25, 2011 for Japanese Patent Application No. 2008-538077, 3 pages.
Office Action mailed Jan. 26, 2010 for Korean Patent Application No. 2008-7012457, 3 pages.
Office Action mailed Jan. 26, 2010 for Korean Patent Application No. 2008-7012467, 5 pages.
Office Action mailed Jan. 26, 2010 for Korean Patent Application No. 2008-7012579, 4 pages.
Office Action mailed Jan. 29, 2010 for Korean Patent Application Serial No. 2008-7012464, 5 pages.
Office Action mailed Oct. 30, 2009 for Korean Patent Application No. 2008-7012766, 3 pages.
Office Action mailed Nov. 16, 2009 for Korean Patent Application No. 2008-7012767 3 pages.
Office Action mailed Dec. 18, 2009 for European Patent Application Serial No. 06836601.2, 3 pages.
Office Action mailed Feb. 23, 2010 for Korean Patent Application No. 2008-7012570, 4 pages.
Office Action mailed Feb. 26, 2010 for Korean Patent Application No. 2008-7012460, 4 pages.
Office Action mailed Feb. 26, 2010 for Korean Patent Application No. 2008-7012461, 3 pages.
Office Action mailed Feb. 26, 2010 for Korean Patent Application No. 2008-7012480, 3 pages.
Office Action mailed Feb. 26, 2010 for Korean Patent Application No. 2008-7012604,4 Pages.
Office Action mailed Mar. 10, 2010 for Korean Patent Application No. 2008-7012468, 3 pages.
Office Action mailed Mar. 23, 2010 for Korean Patent Application No. 2008-7012481, 3 pages.
Office Action mailed Apr. 23, 2010 for Korean Patent Application No. 2008-7012767 2 pages.
Office Action mailed Jun. 29, 2010 for Korean Patent Application No. 2008-7012461, 3 pages.
Office Action mailed Aug. 13, 2009 for Korean Patent Application Serial No. 2008-7012757, 3 pages.
Office Action mailed Aug. 2, 2010 for European Patent Application No. 06827064, 8 pages.
Office Action mailed Aug. 27, 2008 for European Patent Application Serial No. 06836601.2, 7 pages.
Office Action mailed Sep. 27, 2010 for Chinese Patent Application No. 200680049453.7, 13 pages.
Office Action mailed Sep. 30, 2010 for Korean Patent Application No. 2008-7012481, 4 pages.
QUALCOMM Europe, Description and link simulations of MIMO schemes for OFDMA based E-UTRA downlink evaluation, 3GPP TSG-RAN WGI #42 R1-050903, Sep. 2, 2005, URL, http://www.3gpp.org/ftp/tsg_ran/WGI_RLI/TSGRI-42/Docs/R1-050903.zip.
QUALCOMM: "UHDR-One Connection Layer: Registration, Paging and Disc. Features" 3GPP2, [Online] Aug. 25, 2006, pp. 1-17, XP002429007.
Rosenberg, J. et al.: "SIP: Session Initiation Protocol ; RFC 3261" Request for Comments: 3261, Jun. 2002, p. 1, 176,177,184-193, XP002423186.
Sandip Sarkar: "QUALCOMM Proposal for 3GPP2 Physical Layer; Version 1.0; pp. 1-10, 72-74; C30-20060522-035 QC-Proposal-v1.0" QUALCOMM; 3GPP2, [Online] May 22, 2006, XP002426839.
Telecommunications Industry Association: Upper Layer (Layer 3) Signaling Standard for CDMA2000 Spread Spectrum Systems, Release C, (186 pages) chapters: 2.6.4.3,2.6.6.2.8,2.73..26..63,. TIA/EIA Interim Standard; TIA/EIA/IS-2000. 5-C, May 2002, XP002423446.
Turner, S. et al., "cdma 2000 Hybrid Access Terminal Operation", Announcement QUALCOMM CDMA Technologies, San Diego, CA, USA, Apr. 9, 2001,pp. 1-25, XP002422171.
U.S. Appl. No. 60/731,037, filed Oct. 27, 2005, entitled "Methods and Apparatus for Providing Mobile Broadband Wireless Higher MAC", 148 pages.
Wonil Roh et. al. : "An Efficient CQICH Signaling for MIMO OFDMA" IEEE 802.16 Broadband Wireless Access Working Group, [Online] Aug. 31, 2004, XP002428096 Retrieved from the Internet : URL : www. ieee802. org/16/>.
3GPP2 C.S0024-A V2.0, Jul. 2005, p. 8-11-8-12, 8-29-8-31, (for information: p. 8-86-8-87, 8-101).
3GPP2 C.S0024-A V2.0, Jul. 2005, pp. 8-10 to 8-12, 8-29 to 8-32, 8-86 to 8-87, 8-106, and 8-168.
3GPP2. Medium Access Control (MAC) Standard for cdma2000 Spread Spectrum Systems, 3GPP2 C.S0003-D Version 1 0, p. 2-87-2.92, Feb. 13, 2004, published online at [http://www.3gpp2.org/Public_html/specs/C.S0003-D.v1.0_MAC_031504.pdf] 8 pages.
802.20 Evaluation Criteria—Ver. 1.0, IEEE 802 LANIMAN Standards Committee, Sep. 23, 2005, pp. 18-35,URL: [http://www.ieee802.org/20/P_Docs/IEEE_802.20-PD-09.doc].
cdma2000 High Rate Packet Data Air Interface Specification, 3GPP2 C.S0024-A, Jul. 2005, Version 2.0, p. 8-151,8-157-8-169, section 8.9.1 and 8.9.6.2.1, URL, http://www.3gpp2.org/Public_html/specs/C.S0024-A_2.0_050727.pdf.
cdma2000 High Rate Packet Data Air Interface Specification, 3GPP2 C.S0024-A Version 2.0, Jul. 2005, p. 8-97-8-114, URL , http ://www.3gpp2 .org/Public_html/specs/C.S0024-Av2.0_050727.pdf.
Chinese OA dated Jan. 19, 2011 for Chinese Application Serial No. 200680049699.4, 11 pages.

(56) References Cited

OTHER PUBLICATIONS

Chinese OA for CN Application No. 200680049464.5, mailed Jan. 10, 2011, 5 pages.
Chinese Office Action dated Nov. 9, 2010, mailed Jan. 12, 2011, for Chinese Patent Application Serial No. 200680049589.8,8 pages.
Chinese Office Action dated Dec. 31, 2010, for Chinese Patent Application Serial No. 200680049364.2, 5 pages.
Chinese Office Action dated Apr. 27, 2011 for Chinese Patent Application Serial No. 200680049463.0,7 pages.
Chinese Office Action dated May 31, 2011 for Chinese Patent Application No. 200680049838.3,4 pages.
Chinese Office Action dated Apr. 20, 2011 for CN Application No. 200680049600.0: 11 pages.
Chinese Office Action dated Apr. 26, 2011, for Chinese Patent Application Serial No. 200680049310.6, 6 pages.
Chinese Office Action dated Dec. 24, 2010 for Chinese Patent Application No. 200680049284,7, 5 pages.
Chinese Office Action dated Dec. 27, 2010 for Chinese Patent Application Serial No. 200680049300.2, 2 pages.
Chinese Office Action dated Dec. 31, 2010 for Chinese Patent Application Serial No. 200680049680.X, 9 pages.
Chinese Office Action dated Feb. 18, 2011, for Chinese Patent Application Serial No. 200680049274.3, 6 pages.
Chinese Office Action dated Feb. 18, 2011 for CN Patent Application Serial No. 200680049802,5, 7 pages.
Chinese Office Action dated Jan. 20, 2011 for Chinese Patent Application No. 200680049251.2.
Chinese Office Action dated Jan. 26, 2011 for Chinese Patent Application Serial No. 200680049492.7, 5 pages.
Chinese Office Action dated Jan. 6, 2011 for Chinese Application Serial No. 200680049670.6, 4 pages.
Chinese Office Action dated Jun. 27, 2011 for Chinese Patent Application Serial No. 200680049300.2, 4 pages.
Chinese Office Action dated Jun. 29, 2011 for CN Application Serial No. 200680049453.7, 4 pages.
Chinese Office Action dated Mar. 2, 2011 for CN Application Serial No. 200680049453.7, 4 pages.
Chinese Office Action dated Oct. 13, 2010, mailed Dec. 7, 2010, for Chinese Patent Application Serial No. 200680049771.3, 11 pages.
Chinese Office Action for Chinese Application No. 200680049812.9 dated Jan. 25, 2011. 11pages.
Chinese Office Action for Chinese Application Serial No. 200680049342.6 dated Apr. 27, 2011, 6 pages.
Chinese Office Action for CN Application Serial No. 200680049677.8 dated Jun. 26, 2011, 7 pages.
Chinese Office Action for CN Application Serial No. 200680049677.8 dated Jul. 13, 2011, 9 pages.
Chinese office Action mailed Jun. 22, 2011, for Chinese Patent Application Serial No. 200680049400.5,4 pages.
Chinese Office Action translation for Chinese Patent Application No. 200680049836.4, dated May 17, 2011. 9 pages.
CN OA dated Dec. 31, 2010 for CN Application Serial No. 200680049332.2, 27 pages.
CN OA dated Jul. 22, 2011 for CN Application Serial No. 200680049332.2, 13 pages.
CN OA for Chinese Application No. 200680049630.1 dated Aug. 5, 2011,4 pages.
CN OA for Chinese Application No. 200680049630.1 dated Dec. 31, 2010,7 pages.
CN Office Action for Chinese Application No. 200680049752.0 mailed Mar. 23, 2011, pp. 4.
CN Office Action mailed Jan. 6, 2011 for Chinese Patent Application No. 200680049640.5, 5 pages.
CN Office Action mailed Feb. 24, 2011 for Chinese Patent Application Serial No. 200680049352.X, 9 pages.
CN Office Action with English translation for CN application No. 200680049443.3 mailed Jan. 26, 2011, pp. 6.
CN Office Action with English translation for CN application No. 200680049740.8 mailed Mar. 16, 2011, pp. 5.

English Translation of Japanese Office Action mailed Feb. 22, 2011 for Japanese Patent Application No. 2008-537965.
EP OA for EP Application No. 06826942.2 dated Jan. 25, 2011,3 pages.
EP OA for EP Application No. 06826942.2 dated Jun. 14, 2011, 5 pages.
ETS 300744, Digital Video Broadcasting; Framing Structure, Channel Coding, and Modulation for digital Terrestrial Television, European Telecommunication Standards Institute (ETSI), Nov. 1996.
European Office Action dated Dec. 19, 2008 for European Application No. 06 817409.3.
European Office Action dated Aug. 11, 2011 for EP Application No, 06817411 9; 7 pages.
European Office Action dated Feb. 8, 2011 for EP Application Serial No. 06827064.4, 14 pages.
Harada et al.. "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
Japanese OA dated Feb. 22, 2011 for JP Application Serial No. 2008-537946, 4 pages.
Japanese OA dated May 10, 2011 for JP Application Serial No. 2008-538094, 3 pages.
Japanese OA mailed May 31, 2011 for Japanese Application Serial No. 2008-538097 , 2 pages.
Japanese Office Action dated Mar. 1, 2011, for Japanese Patent Application Serial No. 2008-538025, 4 pages.
Japanese Office Action dated Dec. 7, 2010 for Japanese Patent Application Serial No. 2008-538002, 3 pages.
Japanese Office Action dated Feb. 15, 2011 for Japanese Patent Application No. 2008-537969.
Japanese Office Action dated Feb. 8, 2011, for Japanese Patent Application Serial No. 2008-537988, 5 pages.
Japanese Office Action dated Jan. 18, 2011 for JP Application No, 2008-537970: 5 pages.
Japanese Office Action dated Jan. 25, 2011 for Japanese Patent Application No. 2008537979,5 pages.
Japanese Office Action dated Jan. 26, 2011, mailed Feb. 1, 2011, for Japanese Patent Application Serial No. 2008-537997, 2 pages.
Japanese Office Action dated Jan. 4, 2011 for Japanese Patent Application Serial No. 2008-537944, 4 pages.
Japanese Office Action dated Jun. 21, 2011 for JP Application No. 2008-537970; 3 pages.
Japanese Office Action dated Mar. 1, 2011, for Japanese Patent Application Serial No. 2008-537964, 6 pages.
Japanese Office Action dated Mar. 15, 2011 for Japanese Application Serial No. 2008-538106, 5 pages.
Japanese Office Action dated Mar. 15, 2011 for JP Patent Application Serial No. 2008-538022, 5 pages.
Japanese Office Action for Japanese Application No. 2008-538096 dated Feb. 8, 2011, 6 pages.
Japanese Office Action for Japanese Application Serial No. 2008-537996 dated Mar. 29, 2011 6 pages.
Japanese Office Action mailed Mar. 1, 2011, for JP Patent Application Serial No. 2008-538079, 6 pages.
Japanese Office Action mailed Dec. 21, 2010, for Japanese Patent Application Serial No. 2008-537985, 3 pages.
JP OA dated Mar. 1, 2011 for JP Application Serial No. 2008-638068, 4 pages.
JP OA for Japanese Application No. 2008-538033 dated Feb. 22, 2011, 2 pages.
JP Office Action for Japanese Application No. 2008-537980 dated Mar. 29, 2011, 4 pages.
JP Office Action for JP application No. 2008-537956 mailed Dec. 7, 2010, 3 pages.
JP Office Action from Japanese Patent Application No. 2008-538084 dated Mar. 29, 2011, pp. 6.
JP Office Action mailed Jan. 11, 2011 for Japanese Patent Application No. 2008-538069, 3 pages.
JP Office Action mailed Feb. 22, 2011 for Japanese Patent Application Serial No. 2008-537994, 5 pages.
JP Office Action with English translation for JP Application No. 2008-538014 mailed Mar. 15, 2011, pp. 11.

(56) References Cited

OTHER PUBLICATIONS

Korean Office Action dated Feb. 17, 2011 for Korean Patent Application Serial No. 2010-7029654, 3 pages.
Office Action dated Jan. 25, 2011 for European Patent Application No. 06826876.2, 3 pages.
Office Action dated Oct. 9, 2010 for Chinese Patent Application No. 200680049399.6, 11 pages.
Office Action dated Mar. 1, 2011 for Japanese Patent Application No, 2008-537995, 4 pages.
Office Action for Chinese Application No. 200680049394.3 dated Jan. 10, 2011, 8 pages.
Office Action for Chinese Patent Application No. 200680049746.5 dated Jan. 26, 2011.
Office Action for Korean Application No. 2008-7012761 dated Mar. 19, 2010, 4 pages.
Office Action for Korean Application No, 2008-7012761 dated Nov. 25, 2011, 4 pages.
Office Action mailed Dec. 14, 2010 for Chinese Patent Application No. 200680049322.9, 5 pages.
Office Action mailed Mar. 9, 2010 for U.S. Appl. No. 12/091,482, 29 pages.
Office Action mailed May 6, 2011 for Chinese Patent Application No. 200680049640.5, 5 pages.
Office Action mailed Sep. 13, 2010 for U.S. Appl. No. 12/091,482, 20 pages.
Preliminary Notice of Reasons for Rejection for Japanese Application No, 2008-537984, dated Mar. 15, 2011 (English Translation).
Qualcomm Europe, "Qualitative Evaluation of MIMO schemes for OFDM-based E-UTRA downlink," 3GPP TSG-RAN WG1 #42bis, R1-051267, Oct. 14, 2005, URL: http:/www.3gpp.org/ftp/tsg_ran/WG1_RL1/TSGR1_42bis/Docs/R1-051267.zip, 5 pages.
Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/docurnents/TIA-EIA-IS-2000-5-A-1.pdf] 11 pages.
TIA-EIA-IS-856, TIA/EIA Interim Standard, "cdma2000 High Rate Packet Data Air Interface Specification," Telecommunications Industry Association, Nov. 2000.
Translation of Chinese Office Action for Chinese Application Serial No. 200680049342.6 dated Jan. 12, 2011, 6 pages.
Translation of Japanese Office Action for Japanese Application Serial No. 2008-538024 dated Feb. 1, 2011.
Translation of Japanese Office Action for JP Application No. 2008-538003, dated Dec. 7, 2010.
Translation of Office Action for Chinese Patent Application No. 200680049832.6 dated Jul. 12, 2011.
Translation of Office Action for Chinese Patent Application No. 200680049832.6 dated Jul. 19, 2011, 4 pages.
Translation of Office Action for Japanese Patent Application No. 2008-538080 dated Mar. 29, 2011.
Translation of Office Action for Japanese Patent Application No. 2008-538081 dated Feb. 8, 2011.
Translation of Office Action in Chinese application 200680049482.3 corresponding to U.S. Appl. No. 12/091,447, citing CN1496636 dated Jan. 20, 2011.
Translation of Office Action in Japan application 2008-517175 corresponding to U.S. Appl. No. 11/454,474, citing JP2004159235, JP0722998 and WO2004107796 dated Feb. 1, 2011.
Translation of Office Action in Japan application 2008-537976 corresponding to U.S. Appl. No. 12/091,461, citing 3GPP2_C_S0024P8_154_8_165_10_45_year_2005, 3GPP2_C_S0024_P8_151_8_170_year_2005, JP2005508588, JP2004153619, P2004530347, JP2001274767, JP2004088180 and JP2005514865 dated Mar. 3, 2010.
Translation of Office Action in Japan application 2008-538031 corresponding to U.S. Appl. No. 12/091,576, citing JP2002026795, JP2003517741, JP2003110582 and WO0247321 dated Feb. 22, 2011.
Translation of Office Action in Japan application 2008-538107 corresponding to U.S. Appl. No. 12/091,475, citing WO2005074184 and JP2005101990 dated Feb. 24, 2011.
Translation of Office Action in Japanese application 2008-537974 corresponding to U.S. Appl. No. 12/091,480, citing EP1487230, JP2005286998, JP2001512638, JP2005502218 and WO0249305 dated Feb. 24, 2011.
Translation of Office Action in Japanese application 2008-538098 corresponding to U.S. Appl. No. 12/091,455, citing 3GPP2_C_S0024_A_XP002430079_pgs_8_155_8_169_year_2005, JP11313370, JP2002010341 and JP2002305534 dated Mar. 3, 2011.
3GPP2 C.S0024-A, "cdma 2000 High Rate Packet Data Air Interface Specification", Version 2.0, 7-18, 8-29, 8-36, 8-38-8-39, 8-41,8-155-8-156, 10-1, Jul. 2005.
3GPP2 C.S0024-A, "CDMA 2000 High Rate Packet Data Air Interface Specification", Version 2.0, 8-15, 8-43, Jul. 2005.
3GPP2 C.S0024-A, "CDMA 2000 High Rate Packet Data Air Interface Specification", Version 2.0, 8-151-8-155, Jul. 2005.
3GPP2 C.S0038-A: "Signaling Conformance Specification for High Rate Packet Data Air Interface"; Sep. 26, 2005.
3GPP2 C: "cdma2000 High Rate Packet Data Air Interface Specification; 3GPP2 C S0024-A version 2.0," 3GPP2 CDMA2000, Jul. 2005, 43 pages, XP002422601.
3GPP2 C: "cdma2000 High Rate Packet Data Air Interface Specification",3GPP2 C. S0024-A version 2.0, 3GPP2 CDMA2000, May 2006, 1621 pages.
3GPP2: "cdma 2000 High Rate Packet Data Air Interface Specification", 3rd Generation Partnership Project 2,3GPP2 C.S0024-A Version 2.0, pp. 8-25-8-28, Jul. 2005.
3GPP2: "cdma 2000 High Rate Packet Data Air Interface Specification", 3GPP2 C.S0024-A, Jul. 2005, Version 2.0, p. 8-26, 8-38.
3GPP2: "cdma 2000 High Rate Packet Data Air Interface Specification", 3GPP2 C.S0024-A, Sep. 2000, Version 2.0, p. 6-7-6-8.
3GPP2: "cdma2000 High Rate Packet Date Air Interface Specification", Version 2.0, 3GPP2 C.S0024-A, 8-68-8-69, Jul. 2005.
Chinese OA dated Jul. 29, 2011 for Chinese Application Serial No. 200680049699.4, 12 pages.
Chinese Office Action dated Aug. 2, 2011, for Chinese Patent Application Serial No. 200680049364.2, 5 pages.
Chinese Office Action dated Sep. 6, 2011, for Chinese Patent Application Serial No. 200680049464.5, 7 pages.
Chinese Office Action dated Aug. 18, 2011 for CN Patent Application Serial No. 200680049802.5, 7 pages.
Chinese Office Action dated Aug. 23, 2011 for Chinese Patent Application No. 200680049251.2, 6 pages.
Chinese Office Action dated Aug. 3, 2011 for Chinese Patent Application Serial No. 200680049492.7, 7 pages.
Chinese Office Action dated Aug. 31, 2011, for Chinese Patent Application Serial No. 200680049274.3, 8 pages.
Chinese Office Action dated Jan. 11, 2011, for Chinese Patent Application Serial No. 200680049428.9, 4 pages.
Chinese Office Action dated Jul. 14, 2010, mailed Sep. 27, 2010 for Chinese Patent Application Serial No. 200680049428.9, 4 pages.
Chinese Office Action dated May 11, 2011, for Chinese Patent Application No. 200680049428.9, 6 pages.
CN Office Action dated Aug. 3, 2011 for CN Patent Application Serial No. 200680049352.X, 10 pages.
English Translation of Japanese Office Action for Japanese Patent Application No. 2008-537984, dated Sep. 13, 2011 7 pages.
European Office Action dated Aug. 11, 2011 for European Patent Application Serial No. 06826727.7, 6 pages.
European Office Action dated Sep. 24, 2010 for European Patent Application Serial No. 06826918.2, 4 pages.
European Office Action for European Patent Application No. 06 817 413.5-2412, dated Aug. 11, 2011.7 pages.
European Office Action from European Application No. 06 827 128.7-2412 dated Aug. 11, 2011.
Japanese Office Action dated Aug. 23, 2011, for Japanese Patent Application Serial No. 2008-538025, 3 pages.
Japanese Office Action dated Aug. 30, 2011 for Japanese Patent Application Serial No. 2008-538023, 3 pages.
Japanese Office Action dated Aug. 16, 2011 for Japanese Patent Application No. 2008-537969, 1 page.

(56) References Cited

OTHER PUBLICATIONS

Japanese Office Action dated Feb. 8, 2011 for Japanese Patent Application Serial No. 2008538082, 3 pages.
Japanese Office Action dated Jul. 26, 2011 for Japanese Application Serial No. 2008-538106, 4 pages.
Japanese Office Action dated Mar. 1, 2011 for Japanese Patent Application Serial No. 2008-538023, 3 pages.
Japanese Office Action dated Sep. 6, 2011 for Japanese Patent Application Serial No. 2008538082, 7 pages.
Japanese Office Action from JP Patent Application No. 2008-538084, dated Aug. 23, 2011. 2 pages.
JP OA mailed Aug. 23, 2011, for JP Application Serial Appl. No. 2008538068, 6 pages.
JP Office Action dated Aug. 2, 2011, for Japanese Patent Application No. 2008-538069, 2 pages.
Korean Office Action dated Jul. 29, 2011 for Korean Patent Application Serial No. 2010-7024469, 3 pages.
Office Action dated Mar. 29, 2011 for Japanese Patent Application No. 2008-537978, 9 pages.
Office Action for Chinese Patent Application No. 200680049746.5 dated Sep. 15, 2011, 5 pages.
Office Action mailed Jan. 29, 2010 for Korean Patent Application No. 2008-7012765, 3 pages.
Jim Tomcik, "C80220-05169: QFDD and QTDD: Proposed Draft Air Interface Specification" IEEE : Contributions to IEEE 80220 session 17: Nov. 14-17, 2005 dated Oct. 28, 2005 XP002422600 http://ieee802org/20/Contributions.html Last accessed Mar. 1, 2007.
IEEE Standard 802.16, IEEE Standard for Local and Metropolitan Area Networks, Part 16: Air Interface for Fixed Broadband Wireless Access Systems, pp. 1-895, Oct. 1, 2004.

* cited by examiner

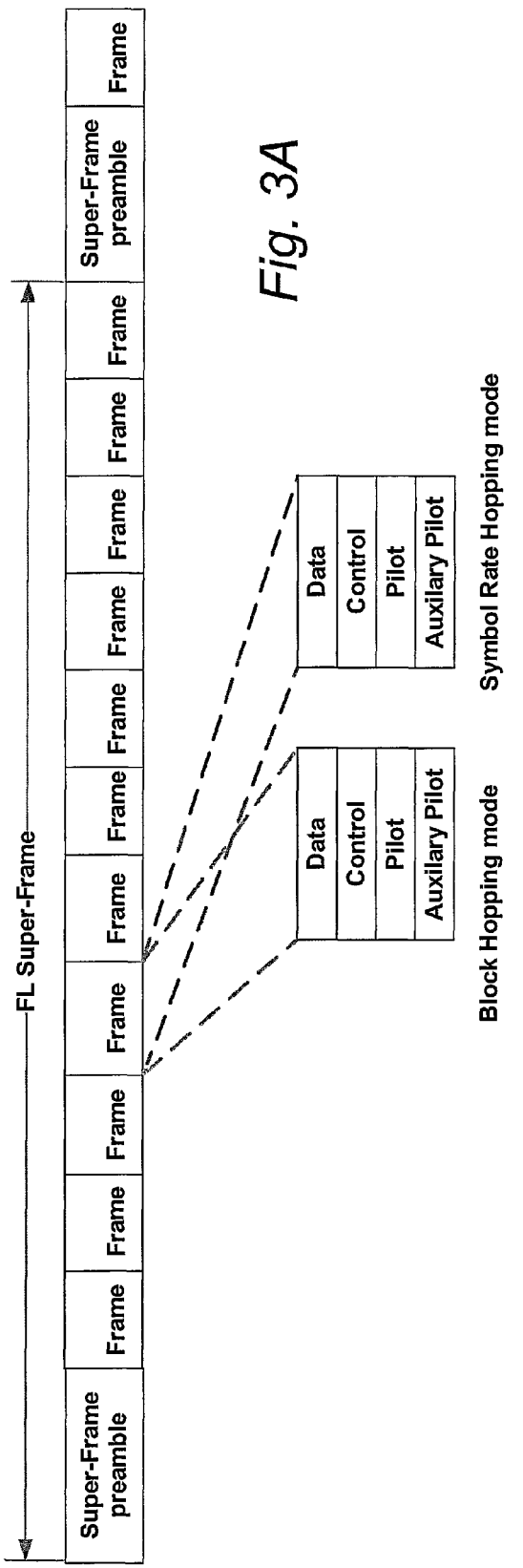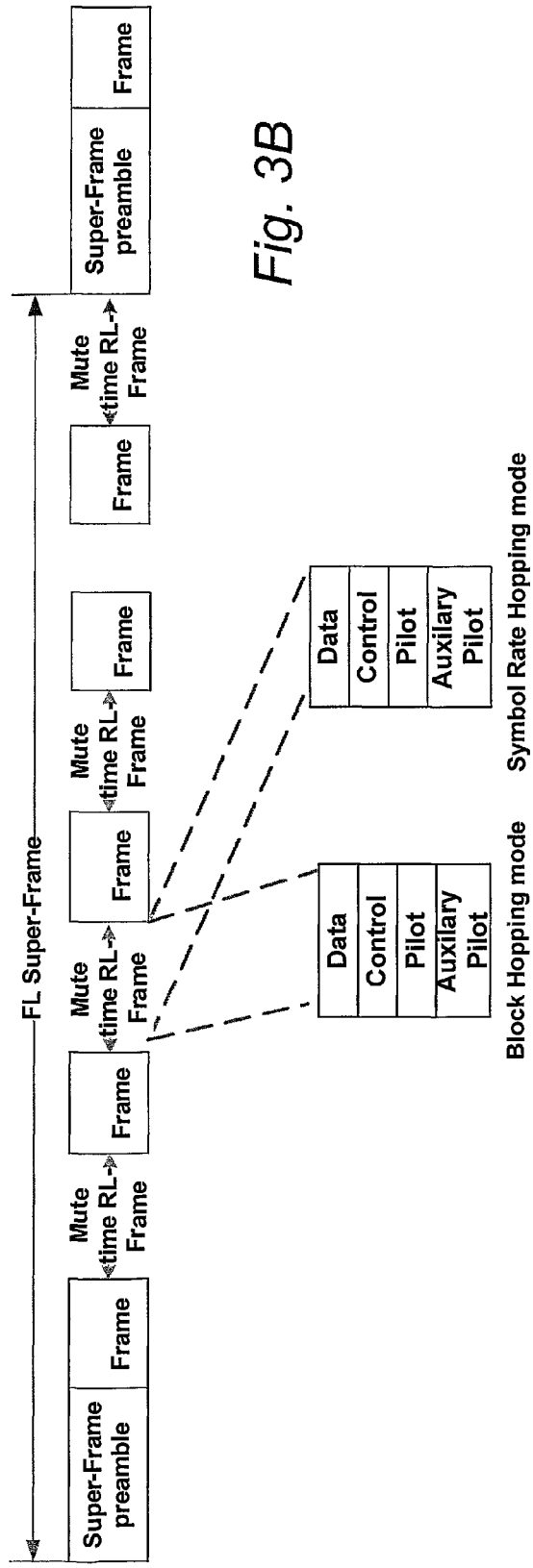

METHOD OF SERVING SECTOR MAINTENANCE IN A WIRELESS COMMUNICATION SYSTEMS

CLAIM OF PRIORITY UNDER 35 U.S.C. §119

The present Application for Patent claims priority to Provisional Application Ser. No. 60/731,037 entitled "METHODS AND APPARATUS FOR PROVIDING MOBILE BROADBAND WIRELESS HIGHER MAC", filed Oct. 27, 2005, assigned to the assignee hereof, and expressly incorporated herein by reference.

BACKGROUND

1. Field

The present disclosure relates generally to wireless communications, and more particularly to methods and apparatus for serving sector maintenance.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

According to one embodiment, a method is provided for serving sector maintenance in a wireless communication system, the method comprising receiving a forward link serving sector (FLSS) change command (ChangeFLSS) and determining if a FLSS in the ChangeFLSS command is a member of a NonSynchronousSubset.

According to another embodiment, an apparatus operable in a wireless communication system, the apparatus comprising means for receiving a forward link serving sector (FLSS) change command (ChangeFLSS) and means for determining if a FLSS in the ChangeFLSS command is a member of a NonSynchronousSubset.

According to yet another embodiment, a computer readable medium is described having a first set of instructions for receiving a forward link serving sector (FLSS) change command (ChangeFLSS) and a second set of instructions for determining if a FLSS in the ChangeFLSS command is a member of a NonSynchronous Subset.

According to yet another embodiment, a method is provided for serving sector maintenance in a wireless communication system, the method comprising receiving a reverse link serving sector (RLSS) change command (ChangeRLSS), determining if a RLSS in the ChangeRLSS command is not a member of a NonSynchronousSubset, updating a RLSS in the public data, issuing a RLSSChanged Indication, updating a dedicated reverse link serving sector (DRLSS) in the public data and issuing a DRLSSChanged Indication.

According to yet another embodiment, an apparatus operable in a wireless communication system is described which includes means for receiving a reverse link serving sector (RLSS) change command (ChangeRLSS), means for determining if a RLSS in the ChangeRLSS command is not a member of a NonSynchronousSubset, means for updating a RLSS in the public data, means for issuing a RLSSChanged Indication, means for updating a dedicated reverse link serving sector (DRLSS) in the public data and means for issuing a DRLSSChanged Indication.

According to yet another embodiment, a computer readable medium is described having a first set of instructions for receiving a reverse link serving sector (RLSS) change command (ChangeRLSS), a second set of instructions for determining if a RLSS in the ChangeRLSS command is a member of a NonSynchronousSubset, a third set of instructions for updating a RLSS in the public data, a fourth set of instructions for issuing a RLSSChanged Indication, a fifth set of instructions for updating a dedicated reverse link serving sector (DRLSS) in the public data and a sixth set of instructions for issuing a DRLSSChanged Indication.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIGS. 3A and 3B illustrate aspects of superframe structures for a multiple access wireless communication system;

DETAILED DESCRIPTION

Figure 1:
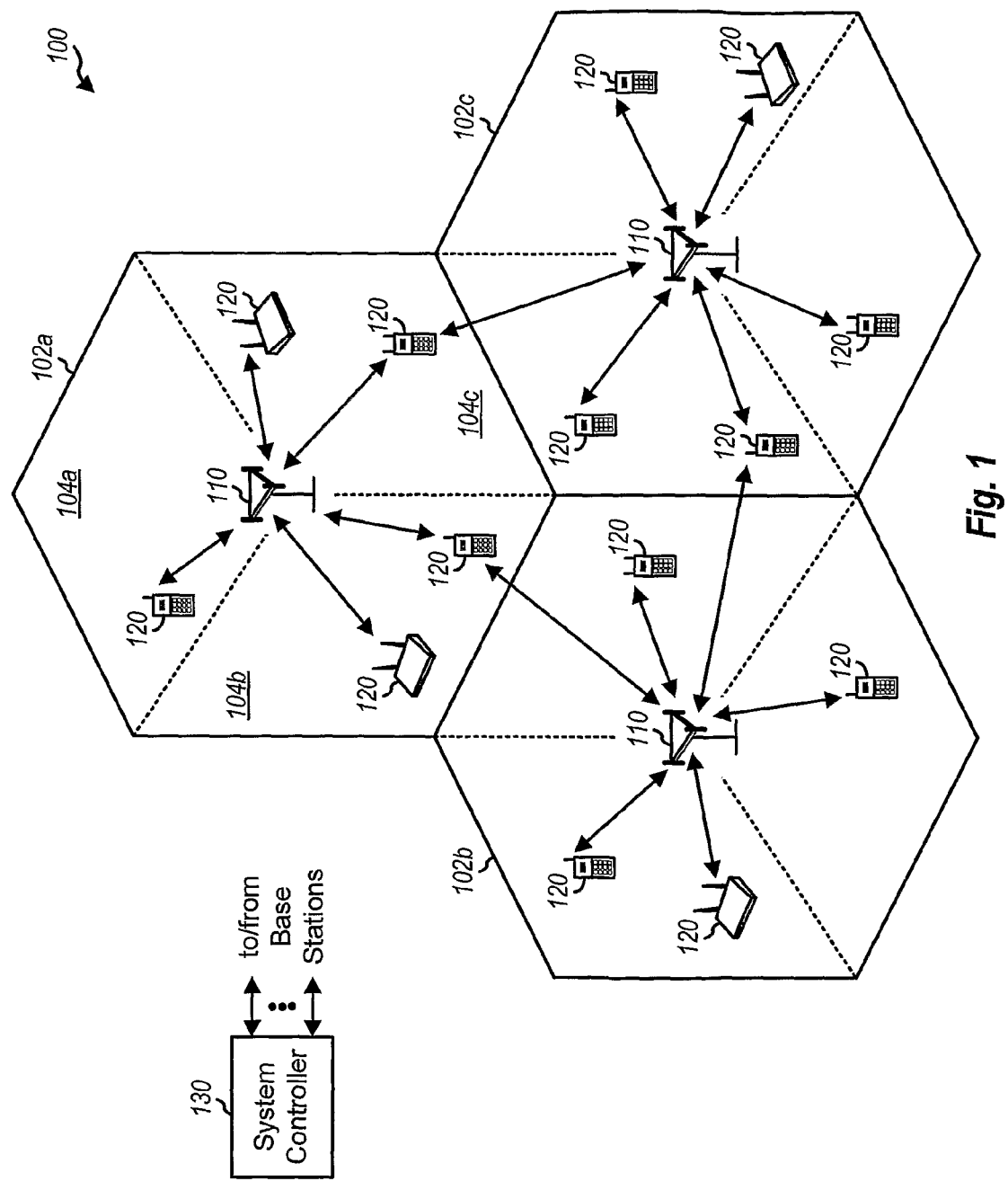
FIG. 1 illustrates aspects of a multiple access wireless communication system.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Referring to FIG. 1, a multiple access wireless communication system according to one aspect is illustrated. A multiple access wireless communication system 100 includes multiple cells, e.g. cells 102a, 102b, and 102c. In the aspect of FIG. 1, each cell 102a, 102b, and 102c may include an access point 110 that includes multiple sectors. The multiple sectors are formed by groups of antennas each responsible for communication with access terminals in a portion of the cell. In cell 102a, antenna groups 104a, 104b, and 104c each correspond to a different sector.

Each cell includes several access terminals which are in communication with one or more sectors of each access point. For example, access terminals 120 are in communication with access points 110.

Controller 130 is coupled to each of the cells 102a, 102b, and 102c. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other aspects, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
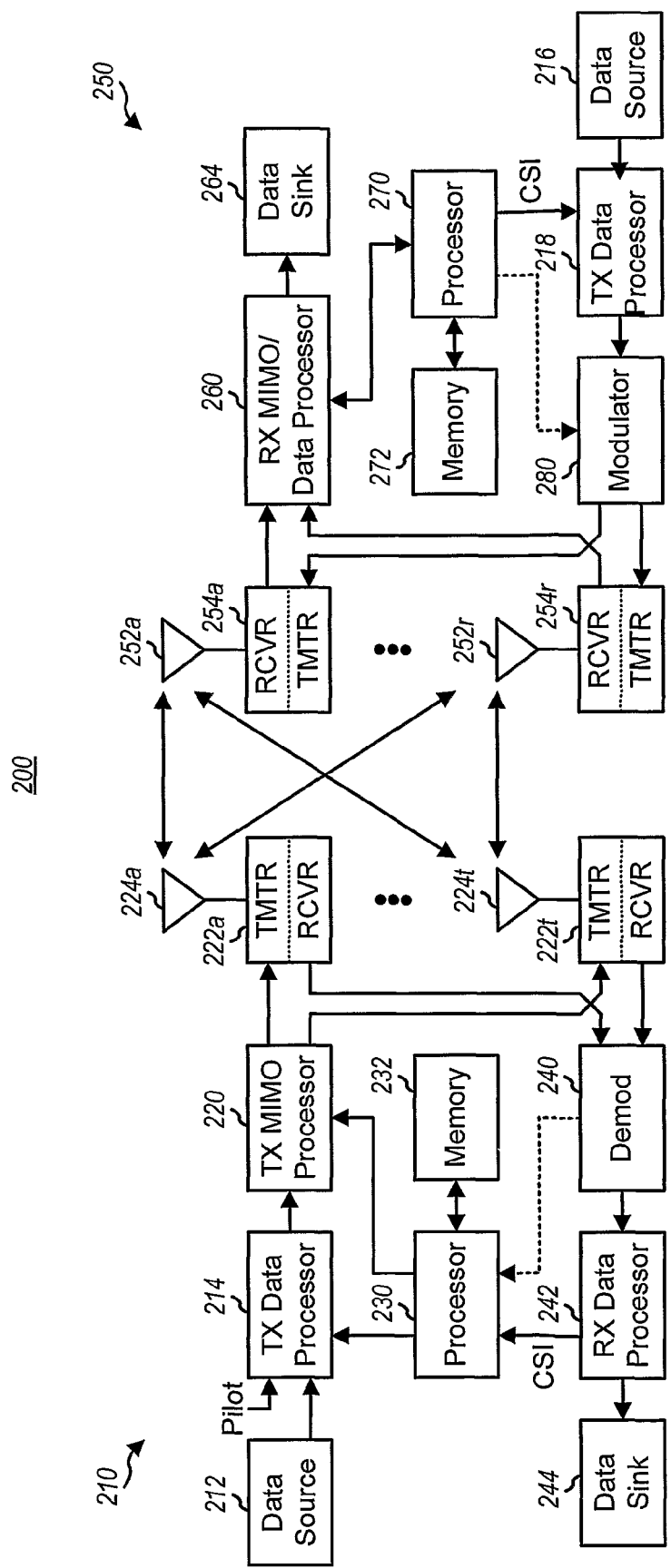
FIG. 2 illustrates aspects of a transmitter and receiver in a multiple access wireless communication system.

Referring to FIG. 2, a block diagram of an aspect of a transmitter system 210 and a receiver system 250 in a MIMO system 200 is illustrated. At transmitter system 210, traffic data for a number of data streams is provided from a data source 212 to transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other aspects, the CSI may comprise a channel quality indicator (CQI), which may be a numerical value indicative of one or more channel conditions. The CSI is then processed by a TX data processor 218, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 232 or 272 in FIG. 2) and executed by a processor (e.g., processor 230 or 270). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Referring to FIGS. 3A and 3B, aspects of superframe structures for a multiple access wireless communication system are illustrated. FIG. 3A illustrates aspects of superframe structures for a frequency division duplexed (FDD) multiple access wireless communication system, while FIG. 3B illustrates aspects of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain aspects, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
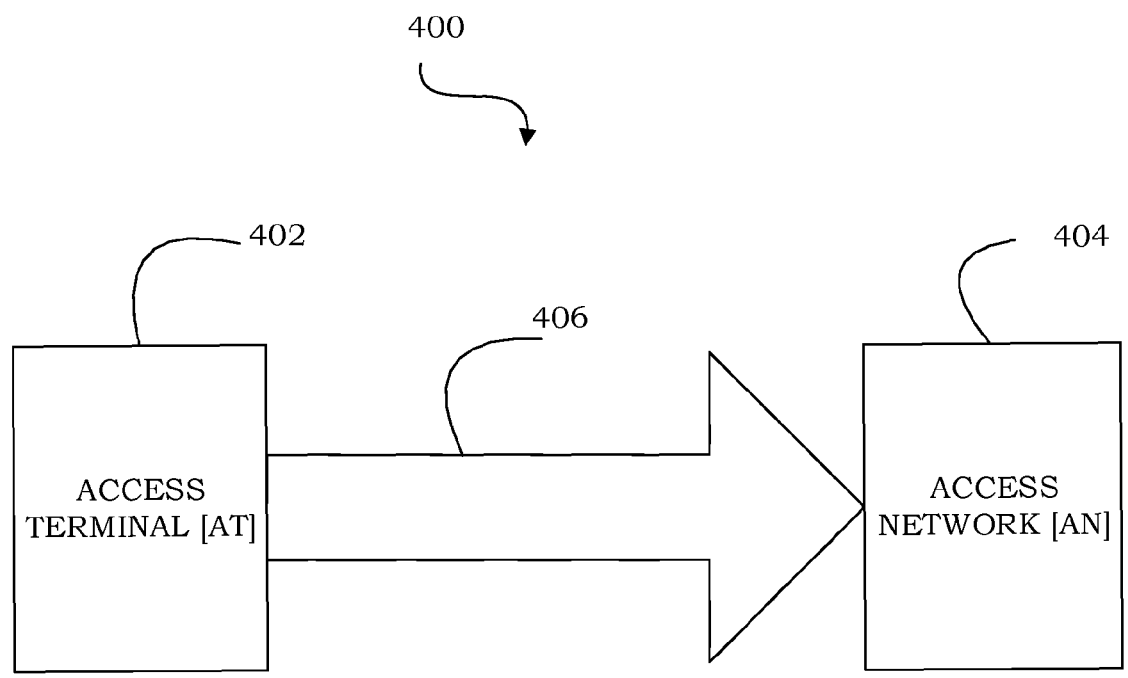
FIG. 4 illustrates aspects of a communication between an access terminal and an access network.

FIG. 4 illustrates communication between an access terminal 402 and an access network 404 according to an aspect. Using a communication link 406 and based upon predetermined timing, system conditions, or other decision criteria, the access network 404 receives a ChangeFLSS command or a ChangeRLSS command. The communication link may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The access network 404 is configured to receive a ChangeFLSS or a ChangeRLSS command over a communication link 406. The ChangeFLSS command contains information that is received by the access network 404 that would indicate that the access network 404 may change the FLSS of the access terminal 402 and the ChangeRLSS command contains information that would indicate that the access network 404 may change the RLSS of the access terminal.

Figure 5:
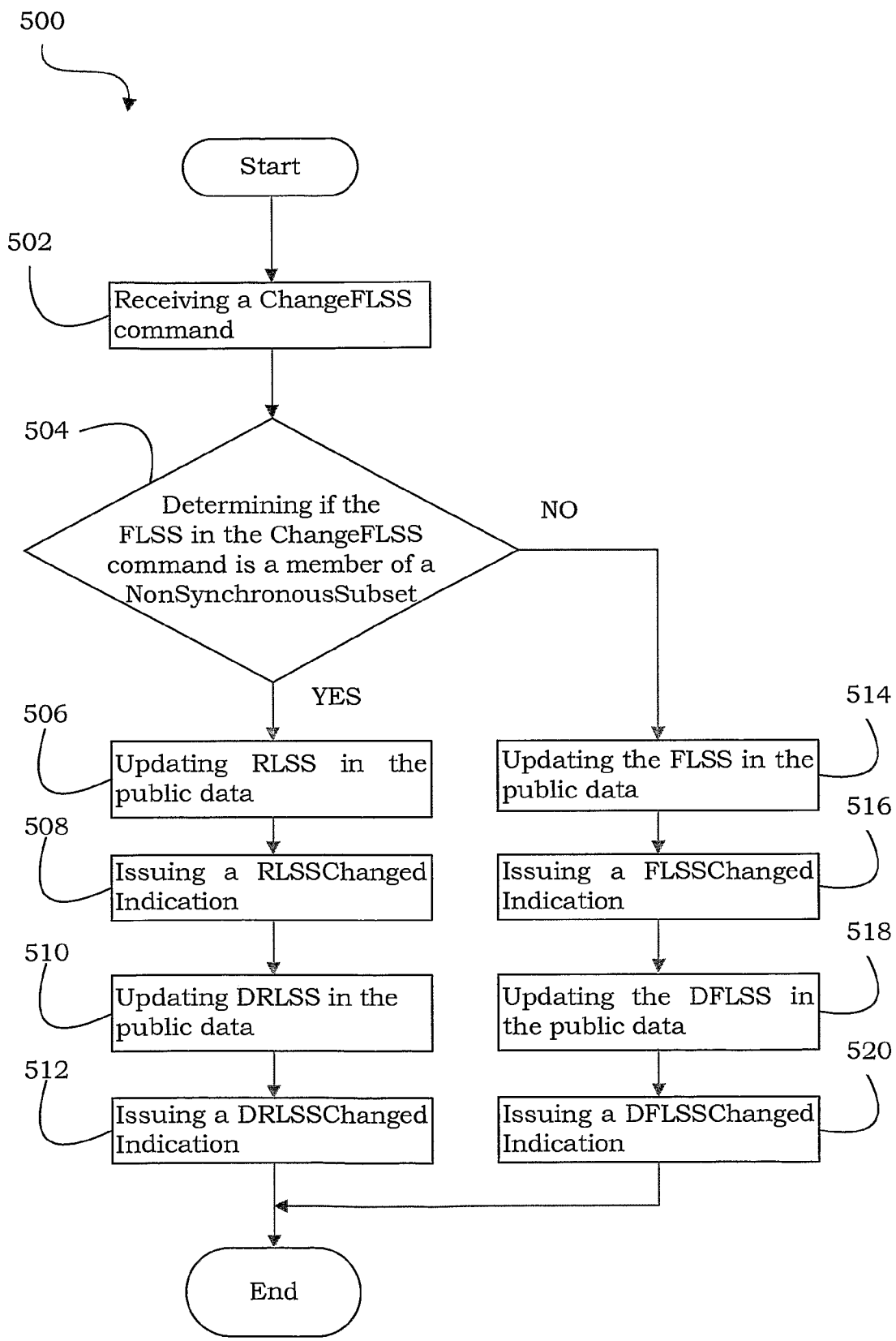
FIG. 5A illustrates a flow diagram of a process used by the access network.
FIG. 5B illustrates one or more processors configured for serving sector maintenance.
Figure 5:
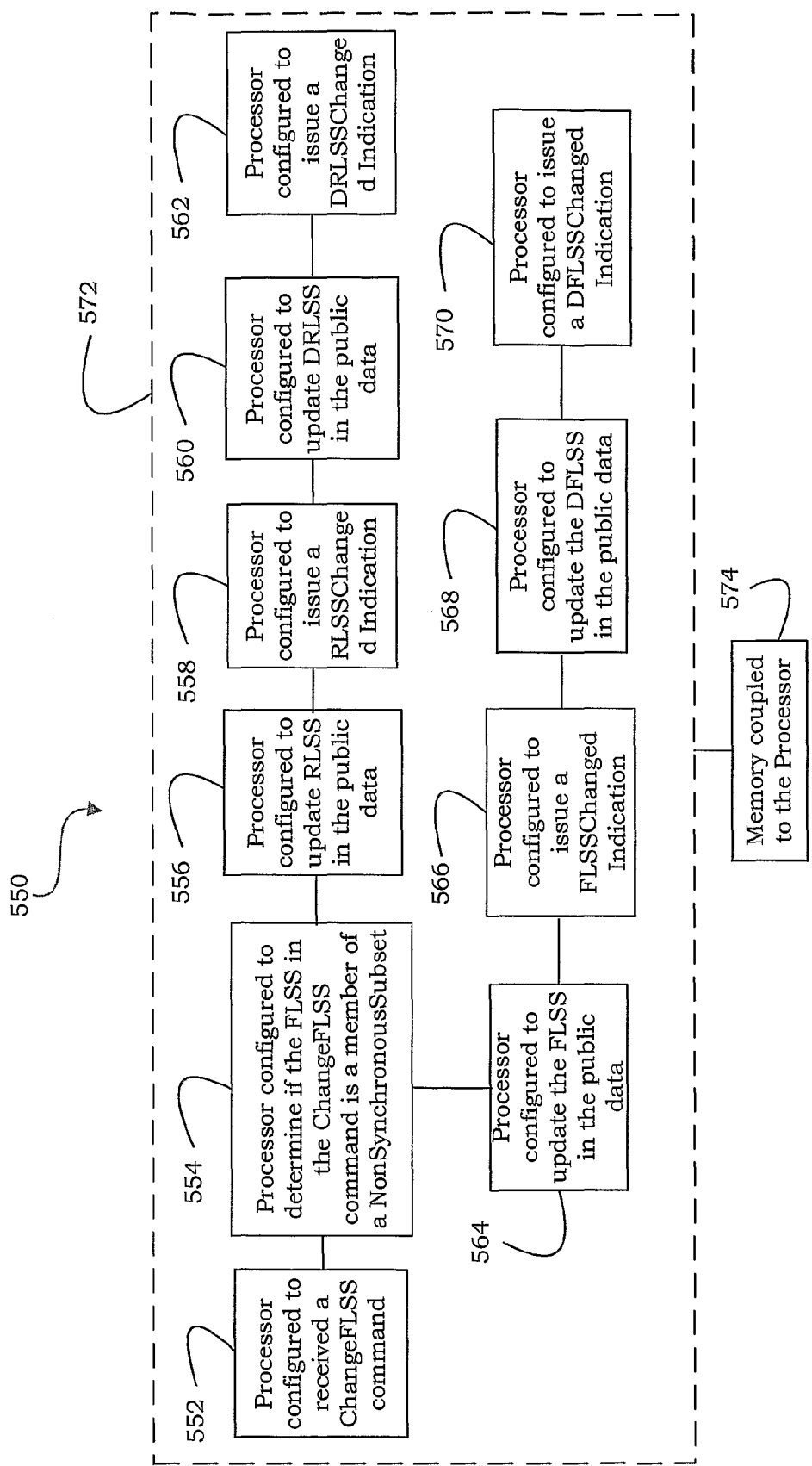

FIG. 5A illustrates a flow diagram of process 500, according to an embodiment. At 502, a forward link serving sector (FLSS) change command (ChangeFLSS) is received and at 504, it is determined if a FLSS in the ChangeFLSS command is a member of a NonSynchronousSubset. In one embodiment, at 506, a reverse link serving sector (RLSS) in the public data is to be equal to the FLSS in the ChangeFLSS command, at 508, a RLSSChanged Indication is issued, at 510, a dedicated reverse link serving sector (DRLSS) in the public data is updated to be equal to the FLSS in the ChangeFLSS command and at 512, a DRLSSChanged Indication is issued. In another embodiment, at 514, the FLSS in the public data is updated to be equal to the FLSS in the ChangeFLSS command, at 516, a FLSSChanged Indication is issued, at 518, a dedicated forward link serving sector (DFLSS) in the public data is updated to be equal to the FLSS in the ChangeFLSS command and at 520, a DFLSSChanged Indication issued. Determining if a FLSS in the ChangeFLSS command is a member of a NonSynchronousSubset increases access terminal efficiency such that one or more of the aforementioned embodiments need not occur.

FIG. 5B illustrates a processor 550 for serving sector maintenance. The processor referred to may be electronic devices and may comprise one or more processors configured for serving sector maintenance. Processor 552 is configured to receive a forward link serving sector (FLSS) change command (ChangeFLSS) and processor 554 is configured to determine if a FLSS in the ChangeFLSS command is a member of a NonSynchronousSubset. In an embodiment, processor 556 is configured to update a reverse link serving sector (RLSS) in the public data to be equal to the FLSS in the ChangeFLSS command, processor 558 is configured to issue a RLSSChanged Indication, processor 560 is configured to update a dedicated reverse link serving sector (DRLSS) in the public data to be equal to the FLSS in the ChangeFLSS command and processor 562 is configured to issue a DRLSSChanged Indication. In another embodiment, Processor 564 is configured to update the FLSS in the public data to be equal to the FLSS in the ChangeFLSS command, processor 566 is configured to issue a FLSSChanged Indication, processor 568 is configured to update a dedicated forward link serving sector (DFLSS) in the public data to be equal to the FLSS in the ChangeFLSS command and Processor 570 is configured to issue a DFLSSChanged Indication. The functionality of the discrete processors 552 to 570 depicted in the figure may be combined into a single processor 572. A memory 574 is also coupled to the processor 572. Determining if a FLSS in the ChangeFLSS command is a member of a NonSynchronousSubset increases processing efficiency such that one or more of the aforementioned embodiments need not occur.

In an embodiment, an apparatus is described which comprises means for receiving a forward link serving sector (FLSS) change command (ChangeFLSS), means for determining if a FLSS in the ChangeFLSS command is a member of a NonSynchronousSubset. The apparatus comprises means for updating a reverse link serving sector (RLSS) in the public data to be equal to the FLSS in the ChangeFLSS command, means for issuing a RLSSChanged Indication, means for updating a dedicated reverse link serving sector (DRLSS) in the public data to be equal to the FLSS in the ChangeFLSS command and means for issuing a DRLSSChanged Indication. The apparatus also comprises means for updating the FLSS in the public data to be equal to the FLSS in the ChangeFLSS command, means for issuing a FLSSChanged Indication, means for updating a dedicated forward link serving sector (DFLSS) in the public data to be equal to the FLSS in the ChangeFLSS command and issuing a DFLSSChanged Indication. The means described herein may comprise one or more processors.

Figure 6:
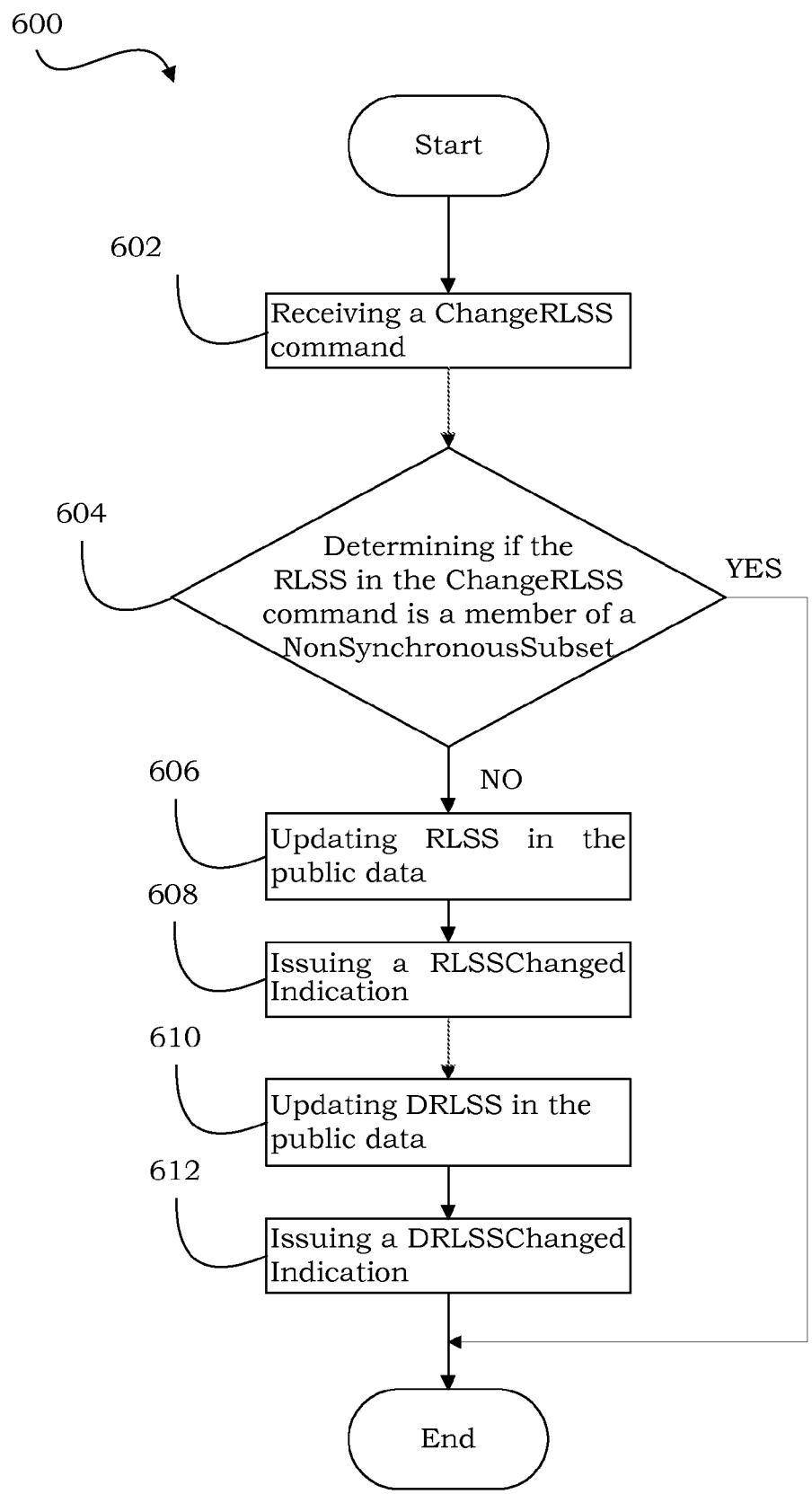
FIG. 6A illustrates a flow diagram of a process used by the access network.
FIG. 6B illustrates one or more processor configured for serving sector maintenance.

FIG. 6A illustrates a flow diagram of process 600, according to an embodiment. At 602, a reverse link serving sector (RLSS) change command (ChangeRLSS) is received and at 604, it is determined if a RLSS in the ChangeRLSS command is not a member of a NonSynchronousSubset. At 606, a RLSS in the public data is updated, at 608, a RLSSChanged Indication is issued, at 610, a dedicated reverse link serving sector (DRLSS) in the public data is updated and at 612, a DRLSSChanged Indication is issued.

Figure 6B:
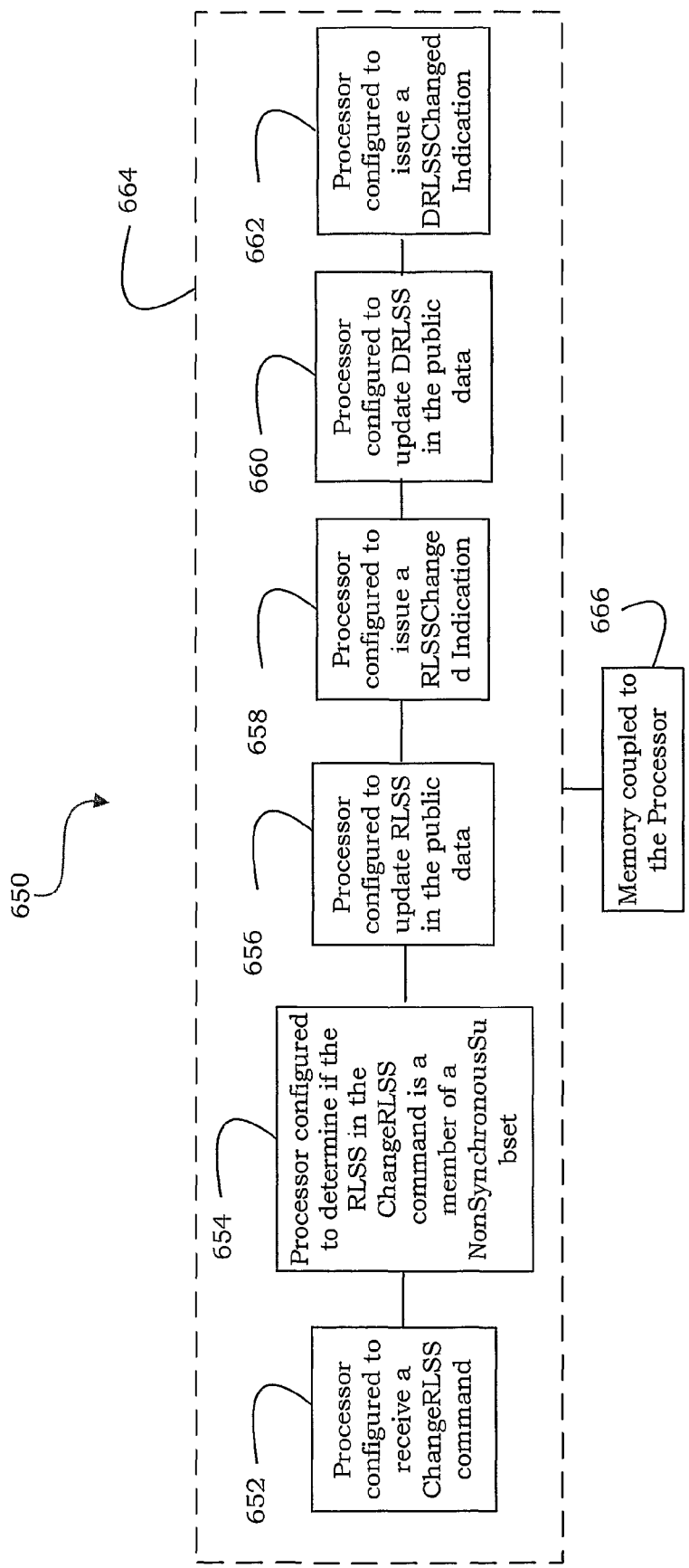

FIG. 6B illustrates a processor 650 for serving sector maintenance. The processor referred to may be electronic devices and may comprise one or more processors configured for serving sector maintenance. Processor 652 is configured to receive a reverse link serving sector (RLSS) change command (ChangeRLSS) and processor 654 is configured to determine if a RLSS in the ChangeRLSS command is not a member of a NonSynchronousSubset. Processor 656 is configured to update a RLSS in the public data, processor 658 is configured to issue a RLSSChanged Indication, processor 660 is configured to update a dedicated reverse link serving sector (DRLSS) in the public data and Processor 662 is configured to issue a DRLSSChanged Indication. The functionality of the discrete processors 652 to 662 depicted in the figure may be combined into a single processor 664. A memory 666 is also coupled to the processor 664.

In an embodiment, an apparatus is described which comprises means for receiving a reverse link serving sector (RLSS) change command (ChangeRLSS) and means for determining if a RLSS in the ChangeRLSS command is not a member of a NonSynchronousSubset. The apparatus comprises means for updating a RLSS in the public data, means for issuing a RLSSChanged Indication, means for updating a dedicated reverse link sector (DRLSS) in the public data; and means for issuing a DRLSSChanged Indication. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various modifications to these aspects will be readily apparent to those skilled in the art, and the generic principles defined herein may be applied to other aspects. Thus, the description is not intended to be limited to the aspects shown herein but is to be accorded the widest scope consistent with the principles and novel features disclosed herein.

We claim:

1. A method for serving sector maintenance in a wireless communication system, comprising:
   receiving a forward link serving sector (FLSS) change (ChangeFLSS) command;
   determining if a FLSS in the ChangeFLSS command is a member of a NonSynchronousSubset; and
   if the FLSS in the ChangeFLSS command is a member of the NonSynchronousSubset;
   updating a reverse link serving sector (RLSS) in public data to be equal to the FLSS in the ChangeFLSS command;
   issuing a RLSSChanged Indication;
   updating a dedicated reverse link serving sector (DRLSS) in the public data to be equal to the FLSS in the ChangeFLSS command; and
   issuing a DRLSSChanged Indication.

2. The method as claimed in claim 1, further comprising:
   if the FLSS in the ChangedFLSS command is not a member of the NonSynchronousSubset;
   updating the FLSS in public data to be equal to the FLSS in the ChangeFLSS command;
   issuing a FLSSChanged Indication;
   updating a dedicated forward link serving sector (DFLSS) in the public data to be equal to the FLSS in the ChangeFLSS command; and
   issuing a DFLSSChanged Indication.

3. An apparatus operable in a wireless communication system, comprising:
   means for receiving a forward link serving sector (FLSS) change (ChangeFLSS) command;
   means for determining if a FLSS in the ChangeFLSS command is a member of a NonSynchronousSubset; and
   if the FLSS in the ChangeFLSS command is a member of the NonSynchronousSubset;
   means for updating a reverse link serving sector (RLSS) in public data to be equal to the FLSS in the ChangeFLSS command;
   means for issuing a RLSSChanged Indication;
   means for updating a dedicate reverse link serving sector (DRLSS) in the public data to be equal to the FLSS in the ChangeFLSS command; and
   means for issuing a DRLSSChanged Indication.

4. The apparatus as claimed in claim 3, further comprising:
   if the FLSS in the ChangeFLSS command is not a member of the NonSynchronousSubset;
   means for updating the FLSS in public data to be equal to the FLSS in the ChangeFLSS command;
   means for issuing a FLSSChanged Indication;
   means for updating a dedicated forward link serving sector (DFLSS) in the public data to be equal to the FLSS in the ChangeFLSS command; and
   means for issuing a DFLSSChanged Indication.

5. A non-transitory computer-readable medium including instructions stored thereon, comprising:
   a first set of instructions for receiving a forward link serving sector (FLSS) change (ChangeFLSS) command; and
   a second set of instructions for determining if a FLSS in the ChangeFLSS command is a member of a NonSynchronousSubset; and
   if the FLSS in the ChangeFLSS command is a member of the NonSynchronousSubset;
   a third set of instructions for updating a reverse link serving sector (RLSS) in public data to be equal to the FLSS in the ChangeFLSS command;
   a fourth set of instructions for issuing a RLSSChanged Indication;
   a fifth set of instructions for updating a dedicated reverse link serving sector (DRLSS) in the public data to be equal to the FLSS in the ChangeFLSS command; and
   a sixth set of instructions for issuing a DRLSSChanged Indication.

6. A method for serving sector maintenance in a wireless communication system, comprising:
- receiving a reverse link serving sector (RLSS) change (ChangeRLSS) command;
- determining if a RLSS in the ChangeRLSS command is a member of a NonSynchronousSubset;
- if the RLSS in the ChangeRLSS command is a member of the NonSynchronousSubset, ignoring the ChangeRLSS command; and
- if the RLSS in the ChangeRLSS command is not a member of the NonSynchronousSubset;
- updating a RLSS in public data;
- issuing a RLSSChanged Indication;
- updating a dedicated reverse link serving sector (DRLSS) in the public data; and
- issuing a DRLSSChanged Indication.

7. An apparatus operable in a wireless communication system, comprising:
- means for receiving a reverse link serving sector (RLSS) change (ChangeRLSS) command;
- means for determining if a RLSS in the ChangeRLSS command is a member of a NonSynchronousSubset;
- if the RLSS in the ChangeRLSS command is a member of the NonSynchronousSubset, means for ignoring the ChangeRLSS command; and
- if the RLSS in the ChangeRLSS command is not a member of the NonSynchronousSubset;
- means for updating a RLSS in public data;
- means for issuing a RLSSChanged Indication;
- means for updating a dedicated reverse link serving sector (DRLSS) in the public data; and
- means for issuing a DRLSSChanged Indication.

8. A non-transitory computer-readable medium including instructions stored thereon, comprising:
- a first set of instructions for receiving a reverse link serving sector (RLSS) change (ChangeRLSS) command;
- a second set of instructions for determining if a RLSS in the ChangeRLSS command is a member of a NonSynchronousSubset;
- if the RLSS in the ChangeRLSS command is a member of the NonSynchronousSubset, a seventh set of instructions for ignoring the ChangeRLSS command; and
- if the RLSS in the ChangeRLSS command is not a member of the NonSynchronousSubset;
- a third set of instructions for updating a RLSS in public data;
- a fourth set of instructions for issuing a RLSSChanged Indication;
- a fifth set of instructions for updating a dedicated reverse link serving sector (DRLSS) in the public data; and
- a sixth set of instructions for issuing a DRLSSChanged Indication.

9. An apparatus for serving sector maintenance in a wireless communication system, comprising:
- a processor;
- memory in electronic communication with the processor; and
- instructions stored in the memory, the instructions being executable by the processor to:
  - receive a forward link serving sector (FLSS) change (ChangeFLSS) command;
  - determine if a FLSS in the ChangeFLSS command is a member of a NonSynchronousSubset; and
  - if the FLSS in the ChangeFLSS command is a member of the NonSynchronousSubset:
  - update a reverse link serving sector (RLSS) in public data to be equal to the FLSS in the ChangeFLSS command;
  - issue a RLSSChanged Indication;
  - update a dedicated reverse link serving sector (DRLSS) in the public data to be equal to the FLSS in the ChangeFLSS command; and
  - issue a DRLSSChanged Indication.

10. An apparatus for serving sector maintenance in a wireless communication system, comprising:
- a processor;
- memory in electronic communication with the processor; and
- instructions stored in the memory, the instructions being executable by the processor to:
  - receive a reverse link serving sector (RLSS) change (ChangeRLSS) command;
  - determine if a RLSS in the ChangeRLSS command is a member of a NonSynchronousSubset;
  - if the RLSS in the ChangeRLSS command is a member of the NonSynchronousSubset, ignore the ChangeRLSS command; and
  - if the RLSS in the ChangeRLSS command is not a member of the NonSynchronousSubset:
  - update a RLSS in public data;
  - issue a RLSSChanged Indication;
  - update a dedicated reverse link serving sector (DRLSS) in the public data; and issue a DRLSSChanged Indication.

* * * * *